US 11,765,538 B2
Sep. 19, 2023

(12) United States Patent
Lyren

(10) Patent No.: US 11,765,538 B2
(45) Date of Patent: *Sep. 19, 2023

(54) WEARABLE ELECTRONIC DEVICE (WED) DISPLAYS EMOJI THAT PLAYS BINAURAL SOUND

(71) Applicant: Pelagic Concepts LLC, Wilmington, DE (US)

(72) Inventor: Philip Scott Lyren, Wadsworth, OH (US)

(73) Assignee: Pelagic Concepts LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/727,772

(22) Filed: Apr. 24, 2022

(65) Prior Publication Data
US 2022/0248159 A1 Aug. 4, 2022

Related U.S. Application Data

(63) Continuation of application No. 17/100,893, filed on Nov. 22, 2020, now Pat. No. 11,323,837, which is a continuation of application No. 16/695,119, filed on Nov. 25, 2019, now Pat. No. 10,848,893, which is a continuation of application No. 16/237,679, filed on Jan. 1, 2019, now Pat. No. 10,499,179.

(51) Int. Cl.
*H04S 7/00* (2006.01)
*H04S 3/00* (2006.01)
*G06T 13/20* (2011.01)

(52) U.S. Cl.
CPC ............ *H04S 7/302* (2013.01); *G06T 13/205* (2013.01); *H04S 3/008* (2013.01); *H04S 2400/01* (2013.01)

(58) Field of Classification Search
CPC . H04S 7/302; H04S 7/40; H04S 3/008; H04S 3/002; H04S 3/006; H04S 2400/01; G06T 13/205
USPC .......................... 381/302, 12, 306, 310, 311
See application file for complete search history.

(56) References Cited

U.S. PATENT DOCUMENTS

| | | |
|---|---|---|
| 5,889,843 A | 3/1999 | Singer et al. |
| 6,990,205 B1 | 1/2006 | Chen |
| 9,584,653 B1 * | 2/2017 | Lyren ................ G06F 3/04842 |
| 9,584,946 B1 | 2/2017 | Lyren et al. |

(Continued)

FOREIGN PATENT DOCUMENTS

WO 2019/082050 A1 5/2019

OTHER PUBLICATIONS

Non-Final Office Action received for U.S. Appl. No. 16/237,679, dated Sep. 18, 2019, 9 pages.

(Continued)

*Primary Examiner* — Ahmad F. Matar
*Assistant Examiner* — Sabrina Diaz
(74) *Attorney, Agent, or Firm* — Kubota & Basol LLP

(57) ABSTRACT

A method assists in playing sound of a graphical representation for an electronic communication between a first person with a first portable electronic device (PED) to a second person with a second PED. The method displays a first visual indication that when selected plays the sound of the graphical representation in stereo or mono sound and a second visual indication that when selected plays the sound of the graphical representation in binaural sound.

20 Claims, 10 Drawing Sheets

Transmit, from a first electronic device or a server in communication with the first electronic device, a graphical representation to a second electronic device.
100

Receive, at the second electronic device, the graphical representation.
110

Display, at the second electronic device, the graphical representation with a first visual indication that plays sound associated with the graphical representation in one of mono sound and stereo sound and with a second visual indication that plays the sound associated with the graphical representation in binaural or 3D sound.
120

(56) References Cited

U.S. PATENT DOCUMENTS

| | | | |
|---|---|---|---|
| 9,591,427 | B1 | 3/2017 | Lyren et al. |
| 10,063,990 | B1 | 8/2018 | Lyren |
| 10,088,868 | B1 | 10/2018 | Hernandez Garcia et al. |
| 10,154,364 | B1 | 12/2018 | Lyren |
| 10,299,065 | B1 | 5/2019 | Lyren |
| 10,306,395 | B1 | 5/2019 | Lyren |
| 10,499,179 | B1* | 12/2019 | Lyren ............... H04S 7/302 |
| 10,499,184 | B2 | 12/2019 | Lyren |
| 10,592,072 | B2 | 3/2020 | Yang et al. |
| 10,757,523 | B2 | 8/2020 | Lyren |
| 10,834,518 | B2 | 11/2020 | Lyren |
| 10,848,893 | B2* | 11/2020 | Lyren ............... G06T 13/205 |
| 10,873,827 | B2 | 12/2020 | Lyren |
| 11,323,837 | B2* | 5/2022 | Lyren ............... H04S 7/302 |
| 2002/0147586 | A1 | 10/2002 | Belrose |
| 2007/0061761 | A1 | 3/2007 | Lee et al. |
| 2008/0187143 | A1 | 8/2008 | Mak-fan |
| 2008/0319764 | A1 | 12/2008 | Nagle et al. |
| 2011/0201362 | A1 | 8/2011 | Bregman-amitai et al. |
| 2013/0141605 | A1 | 6/2013 | Kim et al. |
| 2015/0124975 | A1 | 5/2015 | Pontoppidan |
| 2015/0172599 | A1* | 6/2015 | Caldwell ............... H04N 7/157 348/14.03 |
| 2015/0193197 | A1 | 7/2015 | Nahman et al. |
| 2015/0296086 | A1 | 10/2015 | Eckert et al. |
| 2015/0373477 | A1 | 12/2015 | Norris et al. |
| 2016/0341959 | A1 | 11/2016 | Gibbs et al. |
| 2017/0046123 | A1 | 2/2017 | Song et al. |
| 2017/0111741 | A1 | 4/2017 | Pan |
| 2017/0293461 | A1 | 10/2017 | Mccauley et al. |
| 2017/0359467 | A1 | 12/2017 | Norris et al. |
| 2017/0374173 | A1 | 12/2017 | Nassirzadeh |
| 2018/0026925 | A1 | 1/2018 | Kennedy |
| 2018/0032237 | A1* | 2/2018 | Richards ............... H04N 21/858 |
| 2018/0139565 | A1 | 5/2018 | Norris et al. |
| 2018/0144524 | A1 | 5/2018 | Lotto et al. |
| 2018/0336714 | A1* | 11/2018 | Stoyles ............... G11B 27/036 |
| 2019/0246233 | A1 | 8/2019 | Lyren |
| 2019/0261126 | A1 | 8/2019 | Lyren |
| 2019/0278552 | A1 | 9/2019 | Lyren |
| 2019/0306451 | A1 | 10/2019 | Wang et al. |
| 2020/0084561 | A1 | 3/2020 | Lyren |
| 2020/0097251 | A1 | 3/2020 | Lyren |
| 2020/0100047 | A1 | 3/2020 | Lyren |
| 2020/0213799 | A1 | 7/2020 | Lyren |
| 2020/0312029 | A1 | 10/2020 | Heinen et al. |
| 2020/0389753 | A1 | 12/2020 | Lyren |
| 2021/0058732 | A1 | 2/2021 | Lyren |
| 2021/0105572 | A1 | 4/2021 | Lyren |
| 2021/0112366 | A1 | 4/2021 | Lyren |
| 2022/0225052 | A1 | 7/2022 | Lyren |
| 2022/0295214 | A1 | 9/2022 | Lyren |

OTHER PUBLICATIONS

Non-Final Office Action received for U.S. Appl. No. 16/695,119, dated Apr. 9, 2020, 9 pages.
Non-Final Office Action received for U.S. Appl. No. 17/100,893, dated Jul. 21, 2021, 16 pages.
Notice of Allowance received for U.S. Appl. No. 16/237,679, dated Oct. 4, 2019, 5 pages.
Notice of Allowance received for U.S. Appl. No. 16/695,119, dated Jul. 27, 2020, 5 pages.
Notice of Allowance received for U.S. Appl. No. 17/100,893, dated Jan. 4, 2022, 5 pages.
Examiner Initiated Interview Summary received for U.S. Appl. No. 15/898,587, dated Jul. 25, 2018, 1 page.
Examiner's Answer to Appeal Brief received for U.S. Appl. No. 17/000,316, dated Oct. 20, 2022, 10 pages.
Final Office Action received for U.S. Appl. No. 16/695,115, dated Jul. 12, 2022., 28 pages.
Final Office Action received for U.S. Appl. No. 17/000,316, dated Feb. 15, 2022, 10 pages.
Non-Final Office Action received for U.S. Appl. No. 15/889,185, dated Feb. 19, 2019, 6 pages.
Non-Final Office Action received for U.S. Appl. No. 15/913,927, dated Sep. 23, 2019, 8 pages.
Non-Final Office Action received for U.S. Appl. No. 16/059,049, dated Feb. 14, 2019, 9 pages.
Non-Final Office Action received for U.S. Appl. No. 16/210,013, dated Mar. 25, 2020, 6 pages.
Non-Final Office Action received for U.S. Appl. No. 16/354,184, dated Apr. 30, 2020, 6 pages.
Non-Final Office Action received for U.S. Appl. No. 16/354,185, dated Aug. 30, 2019, 10 pages.
Non-Final Office Action received for U.S. Appl. No. 16/695,113, dated May 20, 2020, 10 pages.
Non-Final Office Action received for U.S. Appl. No. 16/695,115, dated Mar. 2, 2023, 28 pages.
Non-Final Office Action received for U.S. Appl. No. 16/695,115, dated Nov. 2, 2021, 26 pages.
Non-Final Office Action received for U.S. Appl. No. 17/000,316, dated Oct. 29, 2021, 11 pages.
Non-Final Office Action received for U.S. Appl. No. 17/092,201, dated Aug. 26, 2021, 8 pages.
Non-Final Office Action received for U.S. Appl. No. 17/128,189, dated Nov. 5, 2021, 9 pages.
Non-Final Office Action received for U.S. Appl. No. 17/710,088, dated Oct. 27, 2022, 6 pages.
Notice of Allowance received for U.S. Appl. No. 15/889,185, dated Apr. 10, 2019, 7 pages.
Notice of Allowance received for U.S. Appl. No. 15/898,587, dated Jul. 25, 2018, 9 pages.
Notice of Allowance received for U.S. Appl. No. 15/913,927, dated Oct. 11, 2019, 8 pages.
Notice of Allowance received for U.S. Appl. No. 16/059,049, dated Apr. 5, 2019, 9 pages.
Notice of Allowance received for U.S. Appl. No. 16/125,715, dated Oct. 29, 2018, 6 pages.
Notice of Allowance received for U.S. Appl. No. 16/210,013, dated Jul. 7, 2020, 5 pages.
Notice of Allowance received for U.S. Appl. No. 16/354,184, dated Jul. 13, 2020, 7 pages.
Notice of Allowance received for U.S. Appl. No. 16/354,185, dated Sep. 24, 2019, 8 pages.
Notice of Allowance received for U.S. Appl. No. 16/695,113, dated Aug. 24, 2020, 8 pages.
Notice of Allowance received for U.S. Appl. No. 17/092,201, dated Dec. 3, 2021, 5 pages.
Notice of Allowance received for U.S. Appl. No. 17/128,189, dated Feb. 16, 2022, 7 pages.
Notice of Allowance received for U.S. Appl. No. 17/710,088, dated Mar. 9, 2023, 5 pages.
Burgess, David, "Techniques for Low Cost Spatial Audio", UIST'92, Nov. 15-18, 1992, pp. 53-59.
Coleman et al., "An Audio-Visual System for Object-Based Audio: From Recording to Listening", IEEE Transactions on Multimedia, vol. 20, No. 8, Aug. 2018, pp. 1919-1931.
Evans, Michael J., "Mapping an Auditory Space onto a Graphical User Interface", Proceedings IEEE International Conference on Multimedia Computing and Systems, vol. 1, 1999, pp. 807-811.
Pugliese et al., "ATSI: Augmented and Tangible Sonic Interaction", TEI '15: Proceedings of the Ninth International Conference on Tangible, Jan. 15-19, 2015, pp. 97-104.

* cited by examiner

Transmit, from a first electronic device or a server in communication with the first electronic device, a graphical representation to a second electronic device.
100

Receive, at the second electronic device, the graphical representation.
110

Display, at the second electronic device, the graphical representation with a first visual indication that plays sound associated with the graphical representation in one of mono sound and stereo sound and with a second visual indication that plays the sound associated with the graphical representation in binaural or 3D sound.
120

Figure 1

Convolve and/or process, with a processor, mono sound or stereo sound with head-related transfer functions (HRTFs) to change the mono sound or stereo sound into binaural sound before or as sound of a graphical representation plays to a listener.
200

Receive, at an electronic device of the listener, a request or activation of the sound of the graphical representation.
210

Play, to the listener with an electronic device and in response to the request or activation, the sound processed and/or convolved with the HRTFs such that the sound externally localizes as the binaural sound away from a head of the listener.
220

Figure 2

| Display, with an electronic device of a listener, a graphical representation that will play binaural or 3D sound to the listener. 300 |
|---|

| Display, with the electronic device, a visual indication that shows one or more of: (1) where the binaural sound will externally localize or is externally localizing with respect to the listener, (2) a format for how the sound will localize or play to the listener, and (3) options for selecting the format and/or location (SLP) for where or how the sound will play to the listener. 310 |
|---|

Figure 3

| Track an amount of time that one or more visual indications display to the listener. 400 |
|---|

| Remove one or more of the visual indications from being displayed to the listener after the amount of time exceeds a threshold value. 410 |
|---|

Figure 4

Remove one or more of the visual indications from being displayed while the graphical representation continues to be displayed.
500

Sense when the listener activates the graphical representation to play the sound associated with the graphical representation.
510

Re-display, in response to sensing the listener will activate the graphical representation, one or more visual indications that show one or more of:
(1) where the binaural sound will externally localize or is externally localizing with respect to the listener,
(2) a format for how the sound will localize or play to the listener, and
(3) options for selecting the format and/or location (SLP) for where or how the sound will play to the listener.
520

Figure 5

Display a first visual indication inside a head or body of a graphical representation to indicate playing of one of stereo sound and mono sound.
600

Display a second visual indication outside the head or body of the graphical representation to indicate playing of binaural sound.
610

Figure 6

Simultaneously display a plurality of graphical representations that play sound as binaural sound and a plurality of graphical representations that play sound as one of stereo sound and mono sound.
700

Figure 7

WEARABLE ELECTRONIC DEVICE (WED) DISPLAYS EMOJI THAT PLAYS BINAURAL SOUND

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIG. 1 is a method that displays a graphical representation with a visual indication indicating sound will play as one of mono sound, stereo sound, and binaural sound in accordance with an example embodiment.

FIG. 2 is a method that plays binaural sound to a listener in accordance with an example embodiment.

FIG. 3 is a method that displays a graphical representation and a visual indication for binaural sound in accordance with an example embodiment.

FIG. 4 is a method that removes a visual indication after an amount of time exceeds a threshold value in accordance with an example embodiment.

FIG. 5 is a method that re-displays a visual indication in response to sensing an activation of a graphical representation in accordance with an example embodiment.

FIG. 6 is a method that displays a visual indication inside or outside a graphical representation in accordance with an example embodiment.

FIG. 7 is a method that displays graphical representations that play sound as stereo or mono sound and binaural sound in accordance with an example embodiment.

FIG. 8AA is another graphical representation in accordance with an example embodiment.

FIG. 8BB is another graphical representation in accordance with an example embodiment.

FIG. 8CC is another graphical representation in accordance with an example embodiment.

SUMMARY

Figure 8A:
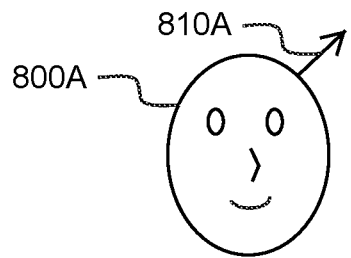
FIG. 8A is a graphical representation in accordance with an example embodiment.

Example embodiments include methods and apparatus that provide a user interface with graphical representations that play binaural sound to a listener.

During an electronic communication between a first user and a second user, an electronic device displays a graphical representation that provides sound in one or more of mono sound, stereo sound, and binaural sound. A user interface provides a convenient way for the listener to select whether the sound plays as mono, stereo, or binaural sound.

Other example embodiments are discussed herein.

DETAILED DESCRIPTION

Binaural sound or three-dimensional (3D) sound externally localizes away from a head of the listener, unlike stereo or mono sound that localizes inside the head of the listener or localizes to a physical sound speaker. Thus, when a listener hears binaural sound, a source or location of the sound occurs outside the head of the listener even though this location may be in empty space or space not occupied with a physical sound speaker or loud speaker.

Binaural sound has many technical challenges and problems, especially when users exchange binaural sound in an electronic communication or play binaural sound in an augmented reality (AR) or virtual reality (VR) environment. Example embodiments offer solutions to these challenges and problems.

Problems occur during an electronic communication and AR and VR environments when sound can play to the listener in different formats, such as mono sound, stereo sound, or binaural sound. The listener may not know how the sound will play. Will the sound play in mono sound, stereo sound, or binaural sound? For example, a listener receives a voice message or graphical representation that plays sound when activated, or the listener activates a sound icon in an AR or VR environment. The listener would not know in advance of hearing the message or sound that it will play in stereo sound versus binaural sound.

Additionally, the listener may not even be aware that these various format options exist for hearing the sound. For example, an electronic device displays a graphical representation that when activated plays sound. The listener assumes that sound will play in a conventional way, such as mono sound or stereo sound. The listener is unaware that the graphical representation actually plays in binaural sound, 3D sound, or spatial audio.

Example embodiments solve these problems and others. These example embodiments include methods and apparatus that provide a convenient way for listeners to select or to know a format for how sound will play upon activation of a graphical representation or other mechanism that that plays binaural sound. Example embodiments also assist in informing the listener where the sound will externally localize with respect to the head or body of the listener (e.g., informing the listener where the sound will originate).

One example embodiment is an electronic device with a user interface that informs the listener how and/or where sound will play to the listener. For example, a display of the electronic device displays a visual indication and/or graphical representation that informs the listener how and/or where the sound will play. For instance, the listener knows in advance of hearing the sound that it will play as mono sound, stereo sound, or binaural sound. The listener can also know in advance a sound localization point (SLP) or location from where the sound will originate to the listener. In this way, the listener knows the format of how the sound will play and/or location from where it will originate in advance of hearing the sound.

The user interface can also assist the listener in selecting the format for how the sound will play and/or selecting the SLP or location from where the listener will hear the sound. For example, the electronic device displays options to hear the sound as mono sound, stereo sound, or binaural sound and also provides a mechanism wherein the listener can move the SLP or select where the SLP occurs. In this way, the listener can control the location of the sound and the format for how he or she hears it.

Consider an example in which an electronic device displays a graphical representation that plays sound to the listener when activated. Along with the graphical representation, the electronic device also displays options for hearing the sound as mono sound, stereo sound, or binaural sound. Selection of the mono option plays the sound in mono sound; selection of the stereo option plays the sound in stereo sound; and selection of the binaural or 3D option plays the sound in binaural sound.

Consider an example in which the electronic device displays the graphical representation that the provides information to the listener or user. This information includes one or more of where the binaural sound will externally localize or is externally localizing with respect to the listener, a format for how the sound will localize or play to the listener, and options for selecting the format and/or location (SLP) for where or how the sound will play to the listener. This information can be presented in the graphical representation itself and/or in a visual indication or indication along with the graphical representation.

FIG. 1 is a method that displays a graphical representation with a visual indication indicating sound will play as one of mono sound, stereo sound, and binaural sound in accordance with an example embodiment.

Block 100 states transmit, from a first electronic device or a server in communication with the first electronic device, a graphical representation to a second electronic device.

The first electronic device or the server transmits the graphical representation and sound over one or more wired or wireless networks (e.g., a cellular network, the internet, etc.) to the second electronic device. For example, the first electronic device or server includes a wireless transmitter/receiver that sends the graphical representation and sound.

Consider an example in which a first user commands or instructs a sound clip to play to a second user during an electronic communication between the first and second users. For example, the first and second users are talking in a telephone call, exchanging text messages, or communicating with each other while playing an AR or VR software game. In response to this command or instruction, the first electronic device transmits a sound clip and/or a graphical representation to the second electronic device.

In another example embodiment, a server or another electronic device transmits the sound and/or graphical representation to the second electronic device. Alternatively, instead of transmitting the sound and/or graphical representation, the server transmits code, a command, or instructions to play sound and/or display a graphical representation.

Consider an example in which the first and second users talk or message each other with a mobile messaging software application. The application executes on the electronic devices and one or more servers. When the first user clicks on a 3D sound emoji, this action causes one of the servers or electronic devices to transmit the 3D emoji and sound to the second electronic device.

Block 110 states receive, at the second electronic device, the graphical representation.

The second electronic device receives the graphical representation and/or sound from the first electronic device or another electronic device (e.g., a server) in communication with the first electronic. For example, the second electronic device includes a wireless transmitter/receiver that receives the sound over one or more networks.

Example embodiments are not limited to the first electronic device sending the graphical representation and/or sound to the second electronic device. Alternatively, the second electronic device stores the graphical representation and/or sound, and the first electronic device sends instructions or a command to play the sound and/or display the graphical representation already stored at the second electronic device. This information can also be received from the server.

Consider an example in which two users communicate with each other while playing an AR or VR game. An electronic device of the first user sends an electronic device of the second user an audio message via a wireless network. Alternatively, the electronic device of the first user does not actually send the audio message but sends instructions or a command to play the audio message already stored at the electronic device of the second user. Upon receiving the audio message and/or instructions to play the audio message, a graphical representation appears on the display of the second user informing him or her of the audio message.

Block 20 states display, at the second electronic device, the graphical representation with a first visual indication that plays sound associated with the graphical representation in one of mono sound and stereo sound and with a second visual indication that plays the sound associated with the graphical representation in binaural or 3D sound.

The graphical representation and/or the visual indication informs how the sound will play to the listener. For example, upon seeing the graphical representation and/or visual indication, the listener knows that he or she will hear 3D sound as opposed to hearing the sound in a conventional manner of mono sound or stereo sound.

Consider an example in which the graphical representation itself and/or a visual indication is modified or changed to visually indicate that the sound will play to the listener as binaural sound, modified or changed to visually indicate that the sound will play to the listener as mono sound, or modified or changed to visually indicate that the sound will play to the listener as stereo sound. Upon seeing the graphical representation and/or visual indication, the listener knows in advance the format of the sound or how the sound will play to the listener.

Consider an example in which an electronic device simultaneously displays two or more visual indications along with the graphical representation. A first indication indicates to the listener that the sound will play as one of mono sound or stereo sound, and a second indication indicates to the listener that the sound will play as binaural sound or 3D sound.

Example embodiments are not limited to using or displaying the terms "mono" or "stereo" or "binaural" sound since listeners may not know what these terms mean. Instead, one or more example embodiments provide the listeners with information so he or she knows that the sound will or is externally localizing or internally localizing. Sound that externally localizes is binaural sound or 3D sound, whereas sound that internally localizes is conventionally or traditionally mono or stereo sound.

Consider an example in which the display of the electronic device simultaneously displays a graphical representation and one or more visual indications. The graphical representation informs the viewer or listener that sound will play upon activation of the graphical representation. This graphical representation, however, does not inform the viewer or listener how the sound will play or from where the sound will originate if the sound is binaural sound. The visual indication provides this information. For example, upon seeing the visual indication, the listener knows the sound will play as 3D sound. Here, the listener recognizes the visual indication as meaning sound from the graphical representation will play as 3D sound.

The visual indication can also represent or stand for other types of sound. For example, upon seeing the visual indication, the listener knows the sound will play inside the head as traditional or conventional sound (e.g., as mono sound or stereo sound). Here, the listener recognizes the visual indication as meaning sound from the graphical representation will play in a traditional or conventional manner.

An example embodiment displays multiple visual indications that assist in selecting a format for the sound. Each indication represents a different format for how sound will play to the listener. For example, upon selection or activation of a first visual indication, sound plays and originates inside the head of the listener as mono or stereo sound. Upon selection or activation of a second visual indication, sound plays and originates outside the head of the listener as binaural or 3D. The listener is thus provided with a quick and convenient way to select how sound will play to the listener. These selections occur via graphical representations and/or visual indications provided to the listener.

An example embodiment displays multiple visual indications that assist in selecting where the sound will externally localize with respect to a head or body of the listener. Each indication represents a different SLP. For example, upon selection or activation of a first visual indication, sound plays and originates outside to a right side of the head of the listener. Upon selection or activation of a second visual indication, sound plays and originates outside to a left side of the head of the listener. The listener is thus provided with a quick and convenient way to select from where the sound will originate (e.g., a way to select the SLP for the sound). These selections occur via graphical representations and/or visual indications provided to the listener.

FIG. 2 is a method that plays binaural sound to a listener in accordance with an example embodiment.

Block 200 states convolve and/or process, with a processor, the mono sound or stereo sound with head-related transfer functions (HRTFs) to change the mono sound or stereo sound into binaural sound before or as the sound of the graphical representation plays to the second person.

The processor, processors, or processing unit processes or convolves the sound before or when the second person, an electronic device, or a software program activates the sound to play to the second person. Convolution occurs before or as the sound plays to the second person so the second person hears the sound as binaural sound and not as mono sound or stereo sound.

For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

An example embodiment processes or convolves the sound with the HRTFs after the sound is provided to the electronic device of the second user but before the second user hears the sound or requests to hear the sound. This expedites processing and/or playing of the sound to the second user since the second user does not have to wait while a processor processes or convolves the sound into binaural sound when the second user subsequently makes a request to hear the sound.

Alternatively, an example embodiment processes or convolves the sound upon request (e.g., when the listener requests to hear the sound). For example, convolve or process the sound when the listener activates the graphical representation and/or visual indication. As another example, this action occurs in real-time (e.g., with streaming video and/or audio).

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

In one example embodiment, the DSP is located in the electronic device of the second user. In other example embodiments, the DSP is located in other electronic devices, such as a server in communication with the first and second electronic devices or in the first electronic device.

The DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound. Other technologies exist as well to provide 3D sound to listeners.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point $(r, \theta, \phi)$) or a general location or area (e.g., localizing to far-field location $(\theta, \phi)$ or near-field location $(\theta, \phi)$). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle ($\theta$), and/or an elevation angle ($\phi$).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example $(r, \theta, \phi)$ in a spherical coordinate system. Here, r is the radial distance from a recording point where the sound is recorded or a distance from a listening point where the sound is heard to an origination or generation point of the sound; $\theta$ (theta) is the azimuth angle between a forward-facing user at the recording or listening point and the direction of the origination or generation point of the sound relative to the user; and $\phi$ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates $(r, \theta, \phi)$ for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information can be calculated or extracted from the HRTF data files. A unique set of HRTF information (including $r, \theta, \phi$) is determined for each unique HRTF.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively, or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location $(\theta, \phi)$ with discrete Fourier transforms (DFTs) calculated for the left and right ears. The ITD is located at the point for which the function attains its maximum value, known as the argument of the maximum or arg max as follows:

$$ITD = \mathrm{argmax}(\tau) \sum_n d_l, \theta, \phi(n) \cdot d_r, \theta, \phi(n + \tau).$$

Subsequent sounds are filtered with the left HRTF, right HRTF, and/or ITD so that the sound localizes at $(r, \theta, \phi)$. Such sounds include filtering stereo and monaural sound to localize at $(r, \theta, \phi)$. For example, given an input signal as a monaural sound signal s(n), this sound is convolved to appear at $(\theta, \phi)$ when the left ear is presented with:

$$s_l(n) = s(n - \mathrm{ITD}) \cdot d_l, \theta, \phi(n);$$

and the right ear is presented with:

$$s_r(n) = s(n) \cdot d_r, \theta, \phi(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau) \cdot h(\tau) = \int_0^\infty x(\tau - t) \cdot h(t) \cdot dt.$$

This reduces to a summation when the impulse response has a given length N and the input signal and the impulse response are sampled at t=iDt as follows:

$$y(i) = \sum_{j=0}^{N-1} x(i-j) \cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

Block 210 states receive, at an electronic device of the listener, a request or activation of the sound.

The second user, an electronic device, or a software program activates the graphical representation and/or plays the binaural sound to the second user. For example, the second user requests or activates the graphical representation and/or sound after the sound was already convolved, before the sound is convolved, or while the sound is being convolved. For instance, the second user clicks on the graphical representation, issues a voice command to play the sound or activate the graphical representation, uses a mouse or pointer to activate or play the sound, commands or instructs a software program to activate or play the sound, issues body gesture (e.g., hand gesture, eye movement, etc.), etc. Activation or playing of the sound can occur in other ways as well. For example, the sound plays when the second person views the graphical representation, opens or enlarges a window, or opens a software program. For example, the sound plays upon occurrence of another event, such as playing at a certain time of day, playing when the user proceeds to a geographical or internet of things (IoT) location, the user enters a virtual space, the user focuses a window, the user dons a PED, the user activates a program, the user turns on or awakes from sleep an electronic device, or other events discussed herein.

Block 220 states play, to the second user with the second electronic device and in response to the request or activation, the sound processed and/or convolved with the HRTFs such that the sound externally localizes as binaural sound away from a head of the second user.

The sound plays to the listener as binaural sound that externally localizes away from or outside of the head of the listener. For example, headphones, earphones, or another electronic device provide this sound at one or more sound localization points (SLPs).

Consider an example in which a first user sends a graphical representation and mono sound to an electronic device of a second user. Before the sound arrives at the electronic device of the second user, the sound transmits to a server. The server convolves the mono sound into binaural sound and transmits this convolved sound to the electronic device of the second user.

Consider an example in which the first user desires to send a graphical representation and sound to the electronic device of the second user. The graphical representation and/or sound are also stored on a server which also stores or has access to the HRTFs of the second user. The server convolves the sound into binaural sound and transmits this convolved sound to the electronic device of the second user.

The electronic device of the first user can transmit the graphical representation and/or sound to the server that convolves the sound. Alternatively, the electronic device of the first user transmits a request to send the graphical representation and/or sound to the second electronic device but does not actually send the graphical representation and/or sound since the graphical representation and/or sound are stored on the server.

Consider an example in which the second user receives the sound to play, such as a recorded voice message, streaming audio, a sound clip, audio file, or other audio from the first user. When the electronic device of the second user receives this sound, a DSP in this electronic device automatically convolves the sound from mono or stereo sound into binaural sound with HRTFs of the second person (e.g. customized HRTFs). When the second user hears this sound with headphones or earphones, the sound externally localizes as binaural sound outside of and away from the head of the second user. This SLP can be, for example, a location in empty space where no tangible object exists, a location in empty space where an image exists, a location in occupied space where no electronic device exists (e.g., sound localizing to a stuffed animal, chair, or wall), or a location in occupied space where an electronic device exists (e.g., sound localizing to an electronic watch with no speakers).

Consider an example in which two users exchange text messages and emojis during an electronic communication while playing an AR or VR game or communicating with a mobile messaging application. An electronic device of the first user transmits a talking emoji to an electronic device of the second user. The second user is busy and does not immediately view the emoji that displays on the display of the second electronic device as an unread message. Immediately upon receipt of the emoji and without a command or instruction from the second user, a digital signal processor (DSP) in the electronic device of the second user convolves or processes the sound of the emoji from mono sound or stereo sound into binaural sound. After this convolution occurs, the second user is no longer busy, and clicks or activates the talking emoji which causes a voice of the first user to say "Give me a call." This voice externally localizes about one meter outside of and away from the head of the second user.

The sound can be obtained or generated in a variety of ways. By way of example, a computer or electronic device generates the sound (computer-generated sound), or microphones capture and record the sound to be sent. For example, one or more microphones capture the sound as mono sound or stereo sound when the first user speaks a message or a voice call to the second user. As another example, the first electronic device or a server in communication with the first electronic device includes a plurality pre-recorded or previously generated sounds that will play to the second user.

The sound can be stored in memory of an electronic device, obtained from memory of an electronic device (such as a computer or server), and/or transmitted or streamed over one or more networks.

Consider an example in which the first electronic device executes a mobile software messaging application that includes hundreds or thousands of sound clips or sound files in mono or stereo sound. The first electronic device obtains or has access to these sound clips or sound files and can send them to other users of the mobile software messaging application. The electronic device, however, may not have permission or access to HRTFs of the other users. Hence, the electronic device sends the sounds to the other users in mono sound or stereo sound.

Consider an example in which the first electronic device obtains the sound when the first user speaks into microphones in the first electronic device or in communication with the first electronic device. The microphones record the voice of the first user as he or she records a message or sound to be played to the second user. The first user sends the sound (with or without a graphical representation) to the second user. For example, the first user sends the actual sound file or a link or network location to the sound. For instance, the second electronic device receives the network location, navigates to the location, retrieves the sound, and convolves the sound into binaural sound for the second user. The second electronic device convolves the sound and changes it from mono or stereo sound into binaural sound for playing to the second user before the second user commands or instructs the electronic device to do so.

Consider an example in which the first and second users talk to each other during an electronic call, telephony call, or telephone call (e.g., a Voice over Internet Protocol or VoIP call). One or more microphones in or in communication with the electronic device of the first user capture the voice of the first user. The voice transmits over the Internet as mono sound or stereo sound to the electronic device of the second user. The electronic device of the second user convolves the sound into binaural sound before the second user requests to hear the sound. In fact, convolution of the sound can occur before the second user is even aware that he or she received sound from the first user. Alternatively, a server in communication with both electronic devices convolves the sound. For instance, the voices first transmit to the server that convolves the sound and forwards the convolved sound to the electronic device of the receiving party.

The electronic device of the second user (or another electronic device) obtains and/or retrieves the head-related transfer functions (HRTFs) used for convolution (e.g., retrieves the HRTFs of the second user). For example, the electronic device retrieves or receives the HRTFs of the second user from memory, such retrieving them from the second electronic device, from a server, from a database, from a network location, etc.

The HRTFs can be generic HRTFs, customized HRTFs, or HRTFs that are customized to the listener. Customized HRTFs or HRTFs that are customized to the listener are specific to an anatomy of a particular listener and are based on a size and/or shape of the head and/or ears of the listener. Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge.

One or more example embodiments expedite playing of sound to a user by prefetching, decrypting, and/or caching the sound before the sound is played to the listener in accordance with an example embodiment.

For example, an electronic device receives or obtains the sound from local memory (e.g., memory on the electronic device), local storage (e.g., memory directly attached to the electronic device), remote storage (e.g., memory accessed over the Ethernet or wireless network), a server, a database, a data center, etc.

For example, a first portable electronic device (PED) sends mono or stereo sound to a second PED over a wireless network (e.g., a cellular network or the Internet). As another example, the electronic device of the user obtains or retrieves the sound in anticipation of the second user requesting to hear or play the sound.

An electronic device retrieves encrypted or non-encrypted HRTFs or other SLI from memory. The sound can be stored and encrypted. For example, the data (e.g., HRTFs, HRIRs, etc.) are encrypted so that only a user, computer, or software program with a secret key (e.g., a decryption key) or password can read the data. Encrypted data is also ciphertext, and unencrypted data is plaintext. Encryption includes asymmetric encryption (or public key encryption) and symmetric encryption.

The HRTFs are encrypted to protect the confidentiality of the data so unwanted third parties cannot access and/or decrypt the data. Encryption thus protects confidentiality of a user's HRTF (e.g., customized HRTFs that are unique to the user).

Generally, each user wants to control who or what has access to the HRTFs of the user. This enables each user to determine what entities can access the HRTFs of the user, especially customized HRTFs since these are unique to each user. Users can input or provide this information about which entities have or do not have access to the HRTFs. This information can also be input or provided with an electronic device or software program. For example, a software program automatically gathers and inputs or updates this information.

Data can be encrypted with an encryption algorithm and encryption key to generate the ciphertext and then stored in memory. For example, symmetric cryptography uses a same key to both encrypt and decrypt the data, while asymmetric cryptography uses two different keys (e.g., one public key and one private key) to encrypt the data.

Prefetching the data occurs when the computer performs fetch operations whose result is expected to be needed soon. The prefetch occurs before the data is known to be needed. Examples of prefetching include cache prefetching and prefetch input queue (PIQ).

Cache prefetching occurs when the processor increases execution by fetching instructions or data from one storage or memory location to a faster storage or memory location before the instructions or data are actually needed. For example, the data is fetched from main memory into local cache memory where it remains until it is needed or required. The data or instructions can be accessed from the cache memory faster than the main memory.

Cache prefetching can occur via hardware and/or software. For example, hardware prefetching occurs when the processor (or a dedicated hardware mechanism in the processor) watches a stream of instructions or data being requested by the executing program, recognizes the next few elements that the program might need based on this stream, and prefetches these elements (data or instructions) into the cache memory of the processor. Software prefetching occurs when the compiler or processor analyzes code and inserts an additional prefetch instruction into the program during compilation.

Fetching the opcodes in advance or prior to their need or request for execution increases the overall efficiency of the processor by boosting its execution speed. The processor is not required to wait for the memory access operations for the next instruction opcode to finish.

The electronic device also decrypts the HRTFs or other SLI. Decryption is the process of transforming data that has been encrypted back to its unencrypted form or state. Decryption is generally the reverse process of encryption. The computer or processor executes to extract and convert the encrypted or garbled data into a readable or understandable version. The data can be decrypted with a decryption algorithm based, for example, on symmetric or asymmetric cryptography. For example, data is decrypted with a secret key or password.

The decrypted HRTFs or SLI is provided to processor that convolves the sound. For example, once the HRTFs are decrypted, the sound is convolved with the HRTFs to transform the sound in binaural sound for the listener.

In anticipation of the binaural sound being requested or played, the binaural sound can be moved into local memory or cache memory. When a request for the sound occurs, convolution is not necessary since the sound was previously convolved in anticipation of the request to play or hear the sound.

In an example embodiment, a preprocessor executes or processes the data to expedite playing, providing, or processing the binaural sound. A preprocessor is a program that processes the retrieved data to produce output that is used as input to another program. This output is generated in anticipation of the use of the output data. For example, an example embodiment executes instructions that predict a likelihood of requiring the output data and preprocesses the data in anticipation of a request for the data. For instance, the program retrieves one or more files containing HRTF pairs and extracts data from the files that will be used to convolve the sound to localize at a location corresponding to the HRTF pair data. This extracted or preprocessed data can be quickly provided to a DSP in the event sound is convolved with the HRTF pair.

As another example, the processor requests a data block (or an instruction block) from main memory before the data block is actually needed. The data block is placed or stored in cache or local memory so the data is quickly accessed and processed to externally localize sound to the user. Prefetching of this data reduces latency associated with memory access.

Prefetching, preprocessing, decrypting, and/or caching the HRTFs can occur or commence upon execution of an event. When the event occurs, prefetching, preprocessing, decrypting, and/or caching commences (e.g., execute one or more blocks associated with the methods discussed herein). Examples of these events include, but are not limited to, one or more of the following: when the user opens a software program (e.g., a mobile messaging application or other software program that enables electronic communication, such as telephone calls and/or messaging), when the user focuses, maximizes, or brings a window to the foreground (e.g., a mobile messaging application or other software program that enables electronic communication), when an electronic device receives a graphical representation from another user or another electronic device (e.g., a first user sends a second user an emoji), when an electronic device receives sound from another user or another electronic device (e.g., a first user sends mono or stereo sound to a second user), when an electronic device receives a voice message (e.g., an electronic device of the first user receives a voice message or voice mail from a second user), when the user dons or turns on headphones or earphones (e.g., this event signifies the user may want to hear binaural sound), when the user records sound with an electronic device, when the user sends sound with an electronic device, when the user dons or turns on a wearable electronic device (e.g., the user dons electronic glasses or a head mounted display), when the user clicks or activates an icon or graphical representation, when the user enters a virtual reality (VR) location (e.g., the user enters a VR chat room), when the user receives or initiates a telephone call or chat or other electronic communication, when the user records a video or captures a photograph with a camera, when the user, electronic device, or software program takes another action that indicates or anticipates binaural sound will be played or requested.

Consider an example in which a mobile messaging software application monitors incoming messages. When the application receives an incoming sound file or audio file (e.g., a WAV file, MP3 file, WMA file, MPEG file, or other audio file format), the application retrieves or obtains the HRTFs of the user who received the audio file and convolves the audio file into binaural sound. Thus, the act of receiving the audio file automatically triggered, caused, or initiated the retrieval of the HRTFs, convolution of the sound, or another action (e.g., discussed in FIG. 2 or 3).

Consider an example in which a user dons a head mounted display (HMD) and enters a virtual office. A light blinking on a virtual voice message machine notifies the user that he or she has voice message. The voice message was previously received in mono sound. In anticipation of the user activating or requesting to listen to the voice message, the software application executing the virtual office prefetches the HRTFs of the user and convolves the mono sound into binaural sound that will localize to an image of the sender if and when the user activates the voice message. In this example, the act of the user entering the virtual office or the user looking at the blinking light of the voice message machine initiated the actions of prefetching the HRTFs and convolving the sound.

A graphical representation can include or be associated with sound. For example, sound plays to the user when the user, an electronic device, or a software program activates the graphical representation or the sound associated with the graphical representation.

Consider an example in which two users execute a mobile messaging software application. The first user sends the second user an animated emoji (or animoji) that when activated or executed says "Hello" in binaural sound to the second user.

By way of example, sound can localize to the listener as mono sound or stereo sound when the sound is not convolved and played to the listener with headphones, earphones, etc. Mono sound and stereo sound can also externally localize to speakers, such as speakers in a smartphone, stereo speakers in a room, etc. Alternatively, sound externally localizes to the listener when the sound is convolved into or captured as binaural sound or 3D sound. Binaural sound externally localizes outside or away from the head of the listener and is not required to localize to a physical object, such as a speaker. For instance, binaural sound can externally localize one or more meters away from a person at a location in empty space (e.g., where no speaker exists or no physical or tangible object exists). Binaural sound can also localize to physical objects that do not have an electronic speaker, such as localizing to a wall or a chair. Sound can also localize as a mix of binaural, mono, and stereo sounds, such as sound commencing as binaural sound then transitioning to stereo sound to the listener.

If the sound is mono sound or stereo sound and not subsequently convolved with HRTFs or other sound localization information (SLI), then the sound will not externally localize as binaural sound. For instance, a user receives a graphical representation and sound recorded in mono or stereo sound.

In an example embodiment, a sound file, sound clip, streaming sound, a recording, or other type of sound associates with or corresponds to a graphical representation. Binaural sound plays to the listener when the graphical representation activates.

In an example embodiment, a user, a listener, a program or software application, or an electronic device activates the graphical representation and/or causes the binaural sound to play to the listener.

For example, the listener interacts with a user interface and provides a command or instruction to play the sound upon receiving the graphical representation. For instance, the user performs one or more actions that include, but are not limited to, clicking or activating an icon, emoji, graphical representation, or other indicia that represents a sound clip, sound file, streaming sound, or recording, selecting the sound from a menu (such as a dropdown menu), selecting the sound from a folder or file (such as a folder or file being displayed to the first user), providing a body gesture (such as a hand gesture or hand movement indicating a desire to play the sound), providing head movement or eye movement (such as the listener moving his or her head in a certain direction or pattern to indicate selection of the sound), providing a voice command (such as the listener speaking an instruction at a natural language user interface), or taking another action to have the sound played to the listener.

As another example, the sound automatically plays. For instance, the sound plays when the listener receives the graphical representation, opens the software program providing the graphical representation, or views the graphical representation on a display. This sound was previously convolved in anticipation of the action occurring to play the sound.

As another example, the sound plays when a sender of the sound (e.g., another user in an electronic communication with the listener) activates the sound or designates when the sound plays.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is altered or convolved and provided to the listener so the sound appears to originate from the sound source or SLP.

In an example embodiment, at least a portion of the sound associated with, corresponding to, or provided from the graphical representation externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

By way of example, the SLP can be an actual point in space (e.g., an empty point in space 1-2 meters away from the head of the listener) or a point on a physical or virtual object (e.g., a mouth or head of an augmented reality (AR) or virtual reality (VR) image). The SLP does not have to be so precise since humans are not always able to localize sound to a particle point. As such, the SLP can also be a general area (e.g., a location next to and on the right side of the listener) or a general direction from where the sound originates to the listener (e.g., a location several meters behind the listener).

Consider an example in which the graphical representation is an emoji that includes a talking animated animal head or human head. When a listener clicks on or activates the emoji, the head talks, and the listener hears the voice as binaural sound that externally localizes about one meter away from the listener. For instance, the voice is convolved with head-related transfer functions (HRTFs) having spherical coordinates (distance $r=1.0$ m, elevation $\phi=0°$, azimuth $\theta=30°$). The listener activates the emoji and hears the voice originate from spherical coordinates (1.0, 0°, 30°).

By way of example, a computer or electronic device generates the sound (computer-generated sound), or microphones capture and record the sound to be sent. For example, one or more microphones capture the sound as mono sound or stereo sound when the first user speaks a message to the second user. As another example, the first electronic device or a server in communication with the first electronic device includes a plurality pre-recorded or previously generated sounds.

Consider an example in which the first electronic device executes a mobile software messaging application that includes hundreds or thousands of sound clips or sound files. The first electronic device obtains or has access to these sound clips or sound files and can send them to other users of the mobile software messaging application.

Consider an example in which the first electronic device obtains the sound when the first user speaks into microphones in the first electronic device or in communication with the first electronic device. The microphones record the voice of the first user as he or she records a message or sound to be played to the second user.

The first electronic device transmits the sound and a graphical representation associated with or corresponding to the sound over one or more wired or wireless networks (e.g., a cellular network, the internet, etc.). For example, the first electronic device includes a wireless transmitter/receiver that sends the sound and graphical representation.

Consider an example in which the first user commands or instructs the sound clip to play to the second user during an electronic communication between the first and second users. In response to this command or instruction, the first electronic device transmits the sound clip and a 3D moving emoji to the second electronic device.

In another example embodiment, a server or another electronic device transmits the sound and/or graphical representation to the second electronic device. Consider an example in which the first and second users talk or message each other with a mobile messaging software application. The application executes on the electronic devices and one or more servers. When the first user clicks on a 3D sound emoji, this action causes one of the servers to transmit the 3D emoji and sound to the second electronic device which receives and convolves the sound before the second user requests to hear the sound.

The second electronic device receives the sound and the graphical representation from the first electronic device or another electronic device (e.g., a server) in communication with the first electronic. For example, the second electronic device includes a wireless transmitter/receiver that receives the sound and graphical representation over one or more networks.

A processor or sound hardware processes or convolves the sound with head-related transfer functions (HRTFs) or other SLI so the sound will externally localize as binaural sound to the listener.

Graphical representations can have many sizes, shapes, and forms (e.g., people, faces, characters, animals, objects, 2D, 3D, etc.). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations can include or be associated with sound, such as a sound clip, a sound file, a recorded voice message, streaming audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users.

By way of example, the sound plays when the listener activates the graphical representation or another action occurs that initiates or activates playing of the sound (e.g., activation or selection of a visual indication). For example, a first user sends a second user an emoji shaped like a heart. This heart appears on a display of an electronic device of the second user. When the second user clicks on the heart, a voice in binaural sound says "I love you" to the second user.

When sound is already convolved into binaural sound, this sound can be converted back into mono or stereo sound or played as mono or stereo sound. For example, the electronic device plays the sound through a single speaker. As another example, the electronic device plays the same channel through both speakers (e.g., play the left channel sound to both the left and right speakers of the headphones or play the right channel sound to both the left and right speakers of the headphones). As another example, the sound is filtered through cross-talk canceling filters. Filters, for example, can eliminate crosstalk and the HRTFs (e.g., by utilizing an inverse filter, such as a Nelson/Kirkeby inverse filter).

In an example embodiment, the electronic device displays the graphical representation with one or more of the following: an indication that the sound will externally localize as binaural sound to the second user, an indication of a location where the sound will externally localize as binaural sound to the second user, and an indication informing the second user to wear headphones or earphones before listening to the sound.

FIG. 3 is a method that displays a graphical representation and a visual indication for binaural sound in accordance with an example embodiment.

Block 300 states display, with an electronic device of a listener, a graphical representation that will play binaural or 3D sound to the listener.

For example, a display of an electronic device displays a graphical representation that will play sound to the listener. The graphical representation provides the listener with a visual representation or indication of an action that will include sound.

Consider an example in which the graphical representation is an image, icon, or symbol that appears in an AR or VR software game. When the user or listener grabs, touches, clicks, shoots, or otherwise activates the graphical representation, sound plays to the user or listener.

Consider an example in which the graphical representation is a 2D or 3D image of a person or animal. When the image speaks, its voice emanates from a location in space where the image exists. The voice thus appears to originate or emanate from the image.

Consider an example in which the graphical representation is an image that is a projection or is projected with the electronic device (e.g., a hologram or other image). Binaural sound from the image appears to the listener to emanate from the graphical representation even though the graphical representation does not actually have speakers at this location.

Block 310 states display, with the electronic device, a visual indication that shows one or more of: (1) where the binaural sound will externally localize or is externally localizing with respect to the listener, (2) a format for how the sound will localize or play to the listener, and (3) options for selecting the format and/or location (SLP) for where or how the sound will play to the listener.

The visual indication can be displayed along with the graphical representation. For example, the visual indication and graphical representation are two different images, symbols, icons, words, etc. For instance, an electronic device displays the visual indication with, near (proximate), on, above, below, to a side, or over the graphical representation.

The visual indication can thus be separate from the graphical representation in that they are two separate and/or distinct bodies or entities. For example, the graphical representation is an image of a talking person or talking emoji, and the visual indication is the symbol "3D" that appears with the graphical representation to indicate voice of the graphical representation is in 3D sound.

Alternatively, the visual indication is not separate from the graphical representation but forms part of it. Together, the visual indication and the graphical representation form the graphical representation. For example, the visual indication forms or is a feature or component of the graphical representation. Both of these create the graphical representation. For instance, the graphical representation is an image of talking person or talking emoji, and the visual indication is the hand of this talking person or talking emoji.

Thus, the graphical representation alone, the visual indication alone, or the graphical representation together with the can show (1) where the binaural sound will externally localize or is externally localizing with respect to the listener, (2) a format for how the sound will localize or play to the listener, and (3) options for selecting the format and/or location (SLP) for where or how the sound will play to the listener.

With regard to (1) above, consider an example in which the display of the electronic device shows an image of a talking person, animal, or emoji; and a voice of this image externally localizes to the listener as 3D sound. The listener would not know where the voice will localize with respect to his or her head. The graphical representation and/or visual indication provides this information to the listener.

Consider an example in which first and second users wear a PED that provides AR or VR images during an electronic communication or telephone call. A display of the second PED displays the first user as a talking image that appears on a chair located in front of the second user. A voice of the first user emanates or originates from this image to the second user as 3D sound. The image of the first user is a graphical representation. Before the call commences, a symbol or image highlights, flashes, blinks, changes color, or emanates light at the location of the chair. This visual indication indicates to the second user that the image of the first user and the 3D voice of the first user will appear at the chair.

With regard to (2) above, consider an example in which the display gives an explicit description of the format of the sound, such providing the user with notice that the sound will be mono, stereo, 3D, binaural, spatial, etc. Alternatively, users may not be aware of such nomenclature or different formats for sound. So, the display provides alternate information that informs the user or listener that the sound will internally localize or externally localize. For instance, the display shows a location in empty space or occupied space for the origin of the sound. This location does not include conventional speakers that play sound. From this information, the user knows that the format of the sound will be binaural sound, 3D sound, or sound that externally localizes.

With regard to (3) above, the electronic device and/or display provides one or more options for selecting the format and/or location (SLP) for where or how the sound will play to the listener. For example, the user interacts with the graphical representation and/or visual indication to select how the sound will play to the user (e.g., as one of mono, stereo, binaural, 3D, spatial, etc.). Additionally, the user interacts with the graphical representation and/or visual indication to select, move, control, or adjust the SLP for this sound. For example, moving the graphical representation and/or visual indication contemporaneously moves the SLP.

Consider an example in which the display shows a graphical representation with a head that represents the head of the listener and a visual indication that represents the SLP for where the listener will or is hearing 3D sound. For example, when the visual indication is located in front of and to a right side of the head of the graphical representation, then the listener hears the sound as originating in front of and to a right side of his or her head. The listener then moves the visual indication being displayed to a left side of the head of the graphical representation. This movement causes the SLP to move to the left side of the head of the listener.

FIG. 4 is a method that removes a visual indication after an amount of time exceeds a threshold value in accordance with an example embodiment.

Block 400 states track an amount of time that one or more visual indications display to the listener.

For example, a timer or clock in an electronic device tracks or times how long a visual indication and/or graphical representation is displayed to the listener. The timer can also track other events or information, such as how long the listener looks at or gazes toward the visual indication and/or graphical representation.

Block 410 states remove one or more of the visual indications from being displayed to the listener after the amount of time exceeds a threshold value.

For example, the threshold value is a predetermined or present amount of time (e.g., one second, two seconds, three seconds, four seconds, . . . one minute, two minutes, etc.). Upon meeting or exceeding this amount of time, the electronic device removes the graphical representation and/or visual indication from being displayed or from being activated.

Consider an example in which a graphical representation includes a visual indication that signifies to the listener that sound will occur as 3D sound. When the graphical representation first displays to the user, the visual indication is emphasized for two seconds (e.g., the visual indication blinks, flashes, or is highlighted or brightened). This emphasis gets the attention of the listener and signals to him or her that the sound will be 3D sound. After expiration of the two seconds, emphasis of the visual indication ceases (e.g., the visual indication is removed from being displayed or continues to be displayed but returns to a non-emphasized state).

FIG. 5 is a method that re-displays a visual indication in response to sensing an activation of a graphical representation in accordance with an example embodiment.

Block 500 states remove one or more of the visual indications from being displayed while the graphical representation continues to be displayed.

The electronic device initially displays or provides one or more visual indications and then removes the visual indication from being displayed or being emphasized. For example, the visual indication ceases to be visible or ceases to be highlighted, colored, brightened, illuminated, flashed, or otherwise emphasized.

Consider an example in which the visual indication displays for a temporary amount of time or until an event occurs. For instance, a first user sends a second user a talking graphical representation. When the second user receives or looks at the graphical representation, a visual indication illuminates to inform the second user that the graphical representation includes 3D sound. The visual indication then disappears while the graphical representation remains being displayed.

Block 510 states sense when the listener activates the graphical representation to play the sound associated with the graphical representation.

Graphical representations can be activated in a variety of ways that include, but are not limited to, providing a voice command, providing a gesture or hand command, clicking the graphical representation or visual indication, activating with a mouse or a pointer, tapping a screen or display, using a wand or other hand held electronic device, or interacting with a user interface (UI) or graphical user interface (GUI).

As noted herein in an example embodiment, the graphical representation and/or visual indication provide one or more of: (1) where the binaural sound will externally localize or is externally localizing with respect to the listener, (2) a format for how the sound will localize or play to the listener, and (3) options for selecting the format and/or location (SLP) for where or how the sound will play to the listener. Once this information is conveyed or provided to the user, the action is accomplished, and the indication is removed, ceased, suppressed, stopped, or de-emphasized.

Consider an example in which the electronic device includes a touchscreen that senses touch from the user or a proximity sensor that senses proximity or motion of a hand or finger of the user. As another example, the electronic device includes a camera that captures images of the user to activate the playing of the sound (e.g., the electronic device includes facial recognition software or gesture-based recognition software). As yet another example, the electronic device activates playing of sound from a voice command received at a natural language user interface or activates playing of the sound from a command received from a console or handheld electronic device (e.g., while a user wears a head mounted display).

Block 520 states re-display, in response to sensing the listener will activate the graphical representation, one or more visual indications that show one or more of: (1) where the binaural sound will externally localize or is externally localizing with respect to the listener, (2) a format for how the sound will localize or play to the listener, and (3) options for selecting the format and/or location (SLP) for where or how the sound will play to the listener.

Upon sensing that the user will activate, is activating, or may activate the sound, the visual indication re-appears or re-displays to provide the information about the sound. For example, re-activate the visual indication upon sensing an event that includes, but is not limited to, the user looking at the graphical representation, a pointer or finger placed at or over the graphical representation, a gesture or voice command directed to the graphical representation, a command or instruction to play the sound, activation of a window or program that executes or includes the graphical representation, hovering of a pointer over the graphical representation, a click at the graphical representation, etc.

Consider an example in which a user receives a talking emoji that provides a voice message in 3D sound. Upon receiving and displaying the emoji to the user, the electronic device displays text or a symbol to indicate that the emoji does not provide sound in a conventional way but instead provides 3D sound. This information, for example, informs or reminds the user to don headphones or earphones so he or she can properly hear the 3D sound. The user is also not surprised or startled upon hearing the 3D sound since the visual indication informs the user what type of sound will play. The user listens to the voice message, and the visual indication informing the user of 3D sound is removed from the emoji. Thereafter, the user hovers a pointer over the graphical representation, and this action causes the visual indication to temporarily re-appear while the pointer hovers at this location. Re-displaying the visual indication in this manner reminds the user that this emoji includes 3D sound.

FIG. 6 is a method that displays a visual indication inside or outside a graphical representation in accordance with an example embodiment.

Block 600 states display a first visual indication inside a head or body of a graphical representation to indicate playing of one of stereo sound and mono sound.

The first visual indication informs the listener that sound will occur in a conventional manner as one of stereo sound or mono sound.

In one example embodiment, the user may set a default setting to mono or stereo sound. Here, the user assumes sounds will play as one of mono or stereo sound unless otherwise noted. In this example, a first visual indication would not be required since the user assumes or knows sound will play as mono or stereo sound unless a visual indication provides information that the sound instead will play as binaural, 3D, or spatial sound.

Block 610 states display a second visual indication outside the head or body of the graphical representation to indicate playing of binaural sound.

The second visual indication informs the listener that sound will occur in an unconventional manner as binaural, 3D, or spatial sound.

Consider an example in which both the first and second visual indications simultaneously display to the user upon receiving or seeing a graphical representation. Here, the user has a choice on how he or she wants to hear the sound. Selection of the first visual indication plays the sound to localize inside the head of the user, while selection of the second visual indication plays the sound to localize outside the head of the user.

FIG. 7 is a method that displays graphical representations that play sound as stereo or mono sound and binaural sound in accordance with an example embodiment.

Block 700 states simultaneously display a plurality of graphical representations that play sound as binaural sound and a plurality of graphical representations that play sound as one of stereo sound and mono sound.

Users can collect, have, or see many graphical representations with each one playing sound in a different format. For example, two graphical representations play sound in mono, five play sound in stereo, and thirty play sound in 3D. The user cannot remember how sound plays for each of the graphical representations without assistance or aid of an example embodiment. For instance, each graphical representation includes a visual indication informing the user about one or more of (1) where the binaural sound will externally localize or is externally localizing with respect to the listener, (2) a format for how the sound will localize or play to the listener, and (3) options for selecting the format and/or location (SLP) for where or how the sound will play to the listener.

Consider an example in which a mobile messaging software application allows users to send to each other talking emojis that include mono or stereo sound and binaural or 3D sound. The display of the electronic device is divided into two sections. One section or area includes emojis that play sound as mono or stereo sound, and one section or area includes emojis that play sound as binaural or 3D sound. The users can easily distinguish between the two different types of emojis based on their location on the display. For instance, if a first user wants to send a second user a talking 3D emoji, then the first user selects an emoji from the section or area on the display dedicated to displaying talking 3D emojis.

Figure 8B:
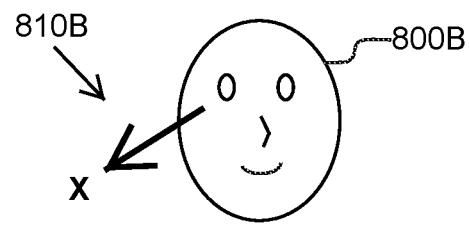
FIG. 8B is another graphical representation in accordance with an example embodiment.
Figure 8C:
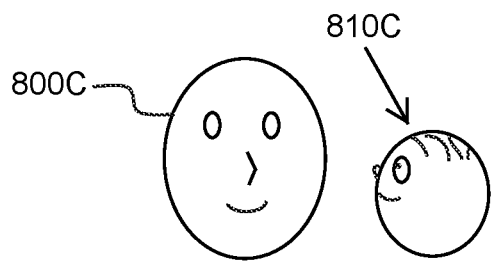
FIG. 8C is another graphical representation in accordance with an example embodiment.

FIGS. 8A-8CC show a plurality of graphical representations with one or more visual indications in accordance with example embodiments. By way of example, the graphical representations 800A-800CC are shown as faces, such as a face of an emoji, picture, video, emoticon, animoji, hologram, etc. Such faces can have many shapes and forms, such as human faces, cartoon character faces, animal faces, animated faces, etc.

Example embodiments are not limited to graphical representations that include faces, such as those shown in FIGS. 8A-8CC. Graphical representations can have many sizes, shapes, and forms (e.g., people, faces, characters, animals, real-time videos, objects, etc.).

Furthermore, these graphical representations are shown as two-dimensional but can also be three-dimensional (3D). Further, the graphical representations can be static, such as a 2D or 3D emoji that do not move or change facial expressions. Alternatively, the graphical representations can be dynamic, such as 2D or 3D emoji that move, talk, change facial expressions, rotate, etc. Further yet, graphical representations in accordance with example embodiments can be presented as AR images and VR images.

The graphical representations 800A-800CC include or are associated with a sound, such as a sound clip, a sound file, a recorded voice message, streaming audio, real-time audio, etc. The sound can play for a short period of time (e.g., less than one second, one second, two seconds, etc.). For example, the sound is a voice saying "Hello" or "Hahahaha" or "Thank you" or another short audio message. As another example, the sound is a computer-generated "Beep" or phone ringing or explosion sound. The sound can play for longer periods of time (e.g., ten seconds, thirty seconds, one minute, several minutes, etc.). For example, the sound is a recorded message from a user during an electronic communication between two users. As another example, the sound occurs during an electronic communication between two or more people (e.g., the graphical representation represents a person to the communication).

By way of example, the sound plays when the listener activates the graphical representation, or another action occurs that initiates or activates playing of the sound. For example, a first user sends a second user an emoji shaped like a heart. This heart appears on a display of an electronic device of the second user. When the second user clicks on the heart, a voice in binaural sound says "I love you" to the second user. As another example, a graphical representation of the second user appears to the first user during or before a telephone call or electronic call between the two users. For instance, the graphical representation of the second user displays to the first user when the first user is talking to the second user or when the second user wants to initiate an electronic communication with the first user.

With example embodiments, the graphical representations can represent or symbolize the listener or source of sound (depending on what instructions or understandings are provided to the listener and/or users). For example, a graphical representation represents a person during an electronic communication or represents information or instructions during a game (e.g., activate an icon or graphical representation to hear instructions on where to go in a VR or AR game).

The graphical representations and visual indications are displayed to the listener on a display of a WED, PED, HPED, HMD, electronic watch, or another electronic device discussed herein. The electronic device and display are not shown in FIGS. 8A-8CC for ease of illustration. Further, these figures are shown from the point-of-view of the listener looking at the display and/or interacting with the electronic device.

As explained herein, the graphical representation and/or visual indication can be altered or changed in response to determining one or more of (1) where the binaural sound will externally localize or is externally localizing with respect to the listener, (2) a format for how the sound will localize or play to the listener, and (3) options for selecting the format and/or location (SLP) for where or how the sound will play to the listener. For example, the visual indication is added to, removed from, or altered with the graphical representation in response to this determination. As another example, the graphical representation is added, removed, altered, moved, or displayed to show this information to the user.

Further, example embodiments are not limited to using visual indications to show this information, but also include using sound. For example, binaural sound plays to the listener and provides information with regard to one or more of location, direction, magnitude, etc. For instance, the SLP of the sound instructs the listener to look or move to the direction of the SLP.

Consider an example in which the graphical representation is originally sent or displayed as 800A-800CC (e.g., without the visual indication or indication). The graphical representation is altered to include the indication 810A-810CC upon determining one or more of (1) where the binaural sound will externally localize or is externally localizing with respect to the listener, (2) a format for how the sound will localize or play to the listener, and (3) options for selecting the format and/or location (SLP) for where or how the sound will play to the listener.

FIG. 8A shows a graphical representation 800A with an indication 810A shown as an arrow or pointer. One end of the arrow connects to the head of the graphical representation, and another end of the arrow points to a location where binaural sound will externally localize to the listener. Indication 810A points upward and to one side of the face of the graphical representation. This location shows the listener where the binaural sound will externally localize to the listener when the binaural sound plays to the listener.

Consider an example in which the graphical representation 800A displays on a display in front of the listener and represents a person or character that will talk to the listener. For example, the listener holds a smartphone or wears a HMD or WED, and the display shows the graphical representation 800A in front of the face of the listener. In this instance, the arrow points to a location in space that is upward and to the right of the listener. When the listener activates the graphical representation or the indication, the sound externally localizes to the location indicated with the indication 810A (here, upward and to the right of the face of the listener).

Consider an example in which the arrow is colored (e.g., blue or another color) and/or flashes or changes brightness. When users see this arrow, they know that sound associated with the corresponding graphical representation will externally localize as binaural sound. This arrow appears on other emoji or emoticons. Users recognize the arrow as an indication or message that the sound will be in binaural sound.

Consider an example in which the arrow (or other visual indication) is moveable (e.g., a user clicks, drags, issues a voice command or hand gesture, or otherwise moves the visual indication being displayed). Movement of the visual indication moves the SLP. As such, the user can move the visual indication to the location for a preferred SLP. This movement can occur in real-time while the listener hears the sound, before the listener hears the sound, or after the listener hears the sound (e.g., the listener hears the sound and moves the SLP to a new or different location).

The indications can thus serve as a way to visually inform users that the sound associated with the graphical representation will be binaural sound, stereo sound, or mono sound. For example, users learn to recognize a certain indication as a symbol for binaural sound, a certain symbol for mono sound, or a certain symbol for stereo sound. When a listener sees the arrow pointing to a location outside the head of the graphical representation, the listener immediately knows in advance that the sound will be binaural sound and externally localize, as opposed to mono sound or stereo sound that internally localizes inside a head of the listener.

FIG. 8B shows a graphical representation 800B with an indication 810B. The indication includes a pointer or arrow having one end near or adjacent to eyes of the head of the graphical representation, and another end of the arrow points to a location in empty space (marked with an "X") that is next to one side of the head or the face of the graphical representation. This location at the "X" indicates the SLP or where binaural sound will externally localize to the listener. The arrow also indicates to the listener to look in this direction since this direction is where the sound will externally localize once played. The indication thus shows the listener which direction to look or to face so the listener looks at the SLP when the binaural sound activates and plays to the listener.

Consider an example in which the graphical representation 800B displays through an HMD that the listener wears.

The graphical representation does not initially display the indication 810B. Binaural sound will externally localize at a SLP having spherical coordinate location (1.0, 0.0°, −30°) with respect to the head of the listener as an origin. The sound is about to play, but the listener is looking in a different direction, such as looking at an object at (3.0, 10°, +44°). The listener is thus not current looking at or facing the SLP. In response, the HMD flashes the indication 810B on the display. The indication informs the listener that binaural sound is about to play. The indication also informs the listener to move his or her head in a direction show by the arrow since the sound will externally localize. The listener moves his or her head until the "X" is in his or her field-of-view. When this occurs, the HMD removes the indication 810B and plays the binaural sound as an animated 3D VR talking human character.

Consider an example in which the indication is highlighted with color or light or provided to signal to the listener. For instance, the indication blinks or flashes to gain the attention of the listener and show one or more of (1) where the binaural sound will externally localize or is externally localizing with respect to the listener, (2) a format for how the sound will localize or play to the listener, and (3) options for selecting the format and/or location (SLP) for where or how the sound will play to the listener.

FIG. 8C shows a graphical representation 800C with an indication 810C shown as head of a person. The indication and the graphical representation together show where the binaural sound will externally localize to the listener before or while the sound plays to the listener.

Consider an example in which a first user and a second user talk or exchange talking graphical representations during an electronic communication. The first user sends the second user a talking emoji shown as 800C which displays to the second user on a HPED. This emoji is an animated head that looks like or represents the first user. So, the face of the first user appears on the display of the HPED of the second user and faces the second user as shown in FIG. 8C. The indication 810C also appears on this display and represents the head of the second user. So, the second user sees himself or herself (indication 810C) talking to the first user (graphical representation 800C). The relative position of graphical representation 800C to indication 810C clearly shows that the first user is located in front of and to the left of the second user. In other words, the relative position of the two heads on the display of the HPED show where the SLP will be for the second user.

Consider an example in which the display of an electronic device shows two people talking to each other during an electronic communication or telephone call. The display shows each person as a graphical representation. For instance, the electronic device displays the first user as graphical representation 800C and the second person as indication 810C.

Figure 8D:
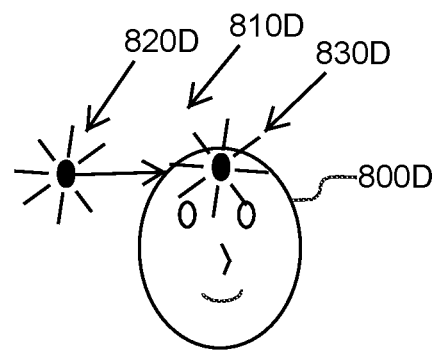
FIG. 8D is another graphical representation in accordance with an example embodiment.

FIG. 8D shows a graphical representation 800D with an indication 810D shown as source of binaural sound (a black dot with lines emanating from the black dot). As shown with an arrow, the source of binaural sound moves from a first location 820D outside a head of a person to a second location 830D inside a head of the person.

The indication 810D provides the listener with a variety of different valuable information. Consider the example in which the graphical representation 800D represents or symbolizes the head of the listener and is shown on a display of an HPED to the listener. First, the indication shows the listener that the sound will be binaural sound since the location 820D is physically located outside of the head of the listener. Second, the indication shows a location of where this binaural sound will initially localize to the listener. As shown, the binaural sound initially has a SLP to a right side of the face of the listener. The indication shows transition or movement of the binaural sound. The SLP starts at 820D and moves along the arrow to 830D. Here, the sound initially localizes as binaural sound and then moves to internally localize as stereo or mono sound.

Consider another example in which an electronic device simultaneously shows the indication 820D at two different locations (e.g., one inside the head of the graphical representation 800D and one outside the head of the graphical representation). Upon seeing these two indications, the listener easily determines that he or she has two options for hearing the sound. One option is to hear the sound outside the head as binaural sound, and one option is to hear the sound inside the head as mono or stereo sound.

Figure 8E:
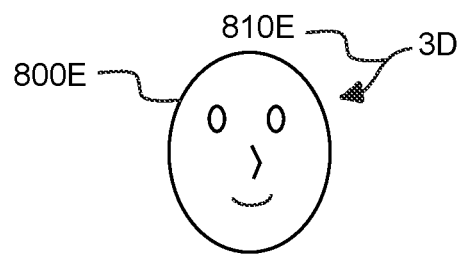
FIG. 8E is another graphical representation in accordance with an example embodiment.

FIG. 8E shows a graphical representation 800E with an indication 810E that includes a curved pointer or arrow. One end of the arrow points to the head or ears of the face of the graphical representation, and another end of the arrow includes a "3D" that indicates three-dimensional (3D) sound or binaural sound.

The indication 810E shows the listener that the sound will or is localizing in binaural sound. The indication also a direction to the source of the sound that is located at the "3D." Furthermore, a size of the "3D" can indicate a distance to the source of the sound. For example, different font sizes represent different distances. For instance, a "3D" with a larger size indicates the source of sound is closer than a "3D" with a smaller size.

Figure 8F:
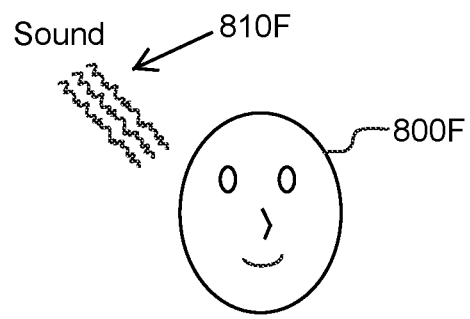
FIG. 8F is another graphical representation in accordance with an example embodiment.

FIG. 8F shows a graphical representation 800F with an indication 810F that shows the sound will externally localize to the listener as binaural sound. The indication includes the word "Sound" and sound waves entering from one side of the head of the graphical representation.

Consider an example in which the graphical representation 800F represents or symbolizes the head of the listener. In this instance, the source of sound originates from a right side located above the head of the listener.

Figure 8G:
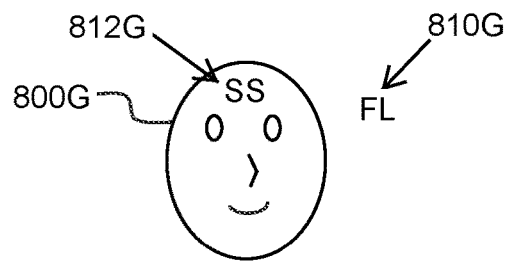
FIG. 8G is another graphical representation in accordance with an example embodiment.

FIG. 8G shows a graphical representation 800G with several indications. One indication 810G shows the sound will externally localize to the listener as binaural sound. The indication includes the acronym or letters "FL" that stand for "front left." Based on this indication, the listener expects the source of sound to be in front of the face of the listener and to his or her left. Another indication 812G shows the sound will play to the listener as stereo sound. The indication includes the acronym or letters "SS" that stand for "stereo sound." Based on this indication, the listener expects the source of sound to be stereo.

The location of the indication can appear inside or outside the body of the graphical representation with words, text, symbols, images, or other indicia that indicate a direction, location, and/or distance to the source of the sound. For example, instead of "FL" the indication includes a compass heading (such as North, South, East, or West) or a coordinate location (such as coordinate location in rectangular coordinates, polar coordinates, or spherical coordinates).

Figure 8H:
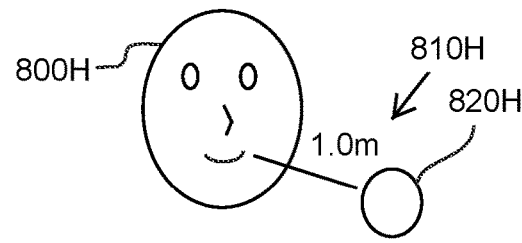
FIG. 8H is another graphical representation in accordance with an example embodiment.

FIG. 8H shows a graphical representation 800H with an indication 810H. The indication includes a SLP or source of sound 820H with respect to the graphical representation 810H. The indication shows a distance (1.0 meter) from the graphical representation to the source of sound. This distance shows the listener that the binaural sound will externally localize one meter away from the head of the listener.

In an example embodiment, the indication remains displayed with the graphical representation. For instance, while the graphical representation displays to the listener, the indication simultaneously displays to the listener. In another example embodiment, the indication displays for a temporary period of time with the graphical representation. For instance, the indication initially displays with the graphical representation to notify or inform the user of the existence and location of the source of the binaural sound. The indication then disappears while the graphical representation continues to display to the listener while the sound plays to the listener.

Consider an example in which a timer in an electronic device tracks or times a duration for how long the indication is displayed or visible to the listener. After a predetermined amount of time, the indication disappears (e.g., is no longer displayed by the electronic device).

Consider an example in which the indication displays while the listener looks or views the indication or graphical representation and ceases to be displayed when the user does not look or view the indication or graphical representation. For example, gaze tracking or head orientation tracking track a gaze or head orientation of the listener. When or while the listener looks at the graphical representation, the indication is displayed. When the user looks away from the graphical representation, the indication disappears while the graphical representation remains displayed.

Figure 8I:
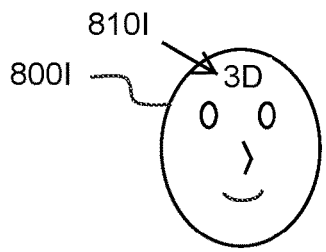
FIG. 8I is another graphical representation in accordance with an example embodiment.

FIG. 8I shows a graphical representation 800I with an indication 810I that shows the sound will externally localize to the listener as binaural sound. The indication includes the acronym or letters "3D" that stand for three-dimensional. Alternatively, the indication is "360" that represents spatial sound or three hundred and sixty degrees (360°) sound. Based on this indication, the listener expects the sound to be 3D sound or binaural sound that externally localizes to the listener.

Consider an example embodiment in which the indication is instead "Mono" or "Stereo" or another symbol, icon, word, or acronym that visually indicates that the sound will localize as or be provided as mono sound or stereo sound.

Figure 8J:
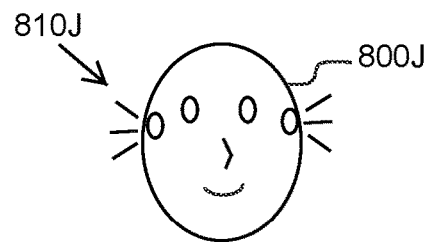
FIG. 8J is another graphical representation in accordance with an example embodiment.

FIG. 8J shows a graphical representation 800J with an indication 810J that shows the face with ears and sound (shown as three lines) emanating into the ears. This information informs the listener to wear headphones and informs the listener that sound is or will be binaural sound that externally localizes away from the head of the listener.

In this example, the indication actually forms part of the body of the graphical representation. Thus, the graphical representation itself can be altered or changed to show the user how or where the sound will play.

Figure 8K:
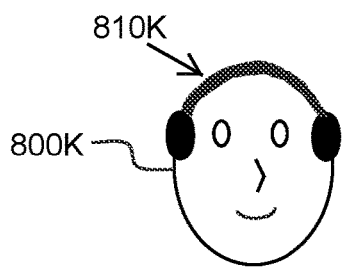
FIG. 8K is another graphical representation in accordance with an example embodiment.

FIG. 8K shows a graphical representation 800K with an indication 810K that includes headphones on the head of the face of the graphical representation. This indication informs the listener to wear or don headphones, earphones, a bone conduction device, or another wearable electronic device before listening to the sound. This information also informs the listener that the sound will play as binaural sound.

Consider an example in which a first user sends a second user a 3D image that talks to the second user. When the second user activates the 3D image, a sound clip plays to the listener as binaural sound that externally localizes away from the head of the second user. The 3D image is or represents the first user. For instance, this image looks like or resembles the first user (e.g., sent in conjunction with a voice message). This 3D image includes the first user wearing headphones. When the second user sees the image of the first user wearing headphones, the second user is reminded or instructed to wear headphones before listening to the sound clip. When the user puts on headphones and the sound clip begins to play, the headphones disappear from the 3D image.

Figure 8L:
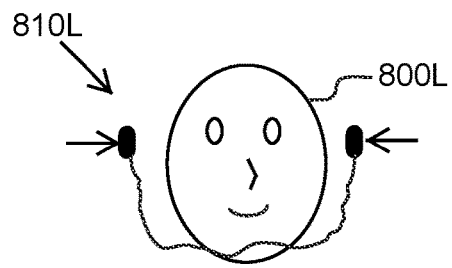
FIG. 8L is another graphical representation in accordance with an example embodiment.

FIG. 8L shows a graphical representation 800L with an indication 810L that instructs a listener to wear earphones or earbuds before listening to the sound associated with the graphical representation. This indication informs the listener to wear or don headphones before listening to the sound. Specifically, the indication shows the graphical representation putting on earphones or shows earphones being placed on the head of the graphical representation. This information reminds or instructs the listener to also put on earphones.

Consider an example in which a display of user simultaneously displays many graphical representations. Graphical representations with indications indicating 3D sound or binaural sound quickly show the user which ones of the graphical representations are in binaural sound or will play as binaural sound. Those graphical representations without such an indication are in stereo or mono sound or will play as stereo or mono sound. Providing such indications with emojis, for example, enables a listener to quickly visually determine a format of emojis with sound (e.g., a format of stereo or mono sound versus a format of binaural sound).

Figure 8M:
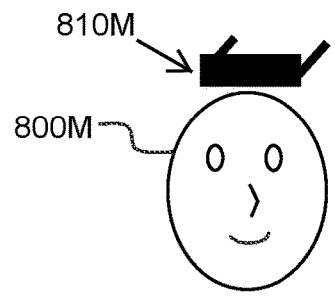
FIG. 8M is another graphical representation in accordance with an example embodiment.

FIG. 8M shows a graphical representation 800M with an indication 810M that instructs a listener to wear a head mounted display (HMD) or other wearable device (e.g., a smartphone that attaches to the head of the listener via a head mount). This indication informs the listener to wear or don the HMD before listening to the sound. Specifically, the indication shows the graphical representation putting on the HMD. This information reminds or instructs the listener to also put on his or her HMD.

Consider an example in which the user clicks or activates the indication 810M. This action informs the electronic device that the user desires to hear the sound as binaural sound. Alternatively, the user clicks or activates the graphical representation 800M (as opposed to activating the indication). This action informs the electronic device that the user desires to hear the sound as mono or stereo sound.

Figure 8N:
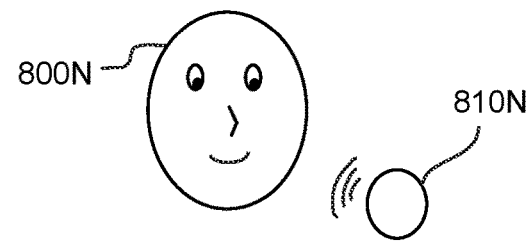
FIG. 8N is another graphical representation in accordance with an example embodiment.

FIG. 8N shows a graphical representation 800N with an indication 810N shown as a source of the binaural sound. The indication includes a circle that represents the source of sound or SLP from where the listener will hear the binaural sound. Three lines indicate sound emanating from the circle to the listener.

The graphical representation 800N also includes eyes that are looking toward the indication 810N. The direction of gaze of the graphical representation shows the listener the direction of the source of sound.

Consider an example in which two users send emojis with 3D sound to each other during an electronic communication. The graphical representation 800N is a 3D talking emoji of the first user that was sent to the HPED of the second user. Before activating the emoji, the second user sees eyes of the graphical representation looking forward but to one side. This same side includes source of sound emitting sound. This information instructs the second user that the sound will be 3D sound or binaural sound. The information also instructs the second user of the location where the second user will hear the sound. When the second user activates the emoji, its mouth moves and begins to talk to the second user. The indication 810N vanishes from the display, and the second user sees the graphical representation 800N talking.

Figure 8O:
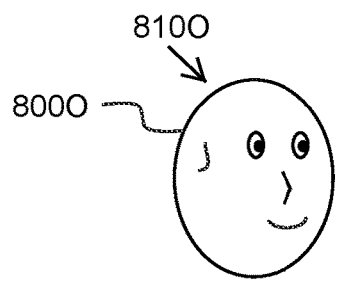
FIG. 8O is another graphical representation in accordance with an example embodiment.

FIG. 8O shows a graphical representation 800O with an indication 810O shown as eyes and face of the graphical representation looking in a particular direction. This direction indicates the location of the binaural sound to the listener.

The face of the graphical representation 800O is rotated to the right from the point-of-view of the listener. This information instructs the listener that the listener should look to his or her right. Alternatively, or additionally, this information instructs the listener that the source of sound or SLP will be to the right of the head of the listener.

FIG. 8O shows that the looking direction or gaze of the eyes can indicate the location of the source of sound or SLP. The direction of the face or looking direction of the face can also indicate this information. For example, the head of the graphical representation 800O rotates to a right to indicate the SLP will be to the right, rotates left to indicate the SLP will be to the left, rotates up to indicate the SLP will be up, etc.

The graphical representation 800O also includes eyes that are looking toward the indication 810O. The direction of gaze of the graphical representation shows the listener the direction of the source of sound.

Figure 8P:
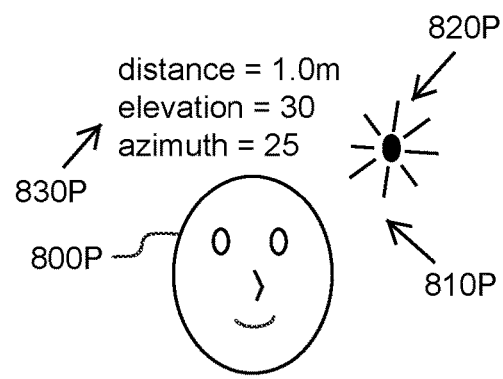
FIG. 8P is another graphical representation in accordance with an example embodiment.

FIG. 8P shows a graphical representation 800P with an indication 810P that includes a source of sound or SLP 820P and information 830P about the location of the SLP. The information shows a coordinate location where the SLP will or does exist for the listener. This SLP has a spherical coordinate location of (1.0 m, 30°, 25°).

In FIG. 8P, the indication 810P shows the precise or exact coordinate location where the sound will play to the listener. The SLP 820P is also positioned at this same location on or thru the display relative the head. Both the coordinate location (shown at 830P) and the SLP 820P show the listener where the sound will play to the listener. In this way, the listener sees a visual location via the display where the sound will externally localize outside of his or her head.

Figure 8Q:
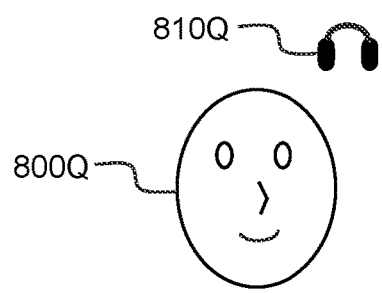
FIG. 8Q is another graphical representation in accordance with an example embodiment.

FIG. 8Q shows a graphical representation 800Q with an indication 810Q that includes headphones or other wearable electronic device that provides sound to the listener. These headphones serve one or more of several functions. First, the headphones instruct the listener to put on headphones. Second, the headphones instruct the listener that the sound the listener will hear will be binaural sound since proper external sound localization of binaural sound requires headphones or earphones. Third, the headphones show a location where the binaural sound will externally localize to the listener. As shown in FIG. 8Q, the sound will originate above and in front of the listener since this is the location of the headphones with respect to the head of the graphical representation.

Figure 8R:
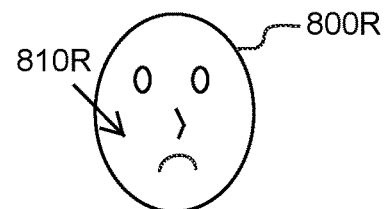
FIG. 8R is another graphical representation in accordance with an example embodiment.

FIG. 8R shows a graphical representation 800R with an indication 810R that includes a facial expression of the graphical representation. The facial expression (shown as a sad face) indicates to the listener that the listener is not ready to hear the sound associated with the graphical representation.

Consider an example in which emojis with sad faces represent that the listener is not wearing headphones or earphones. When the listener puts on headphones or earphones, the emoji with the sad face changes to a happy face. This change and the happy face signify to the listener that the listener is ready to hear the sound as binaural sound.

Figure 8S:
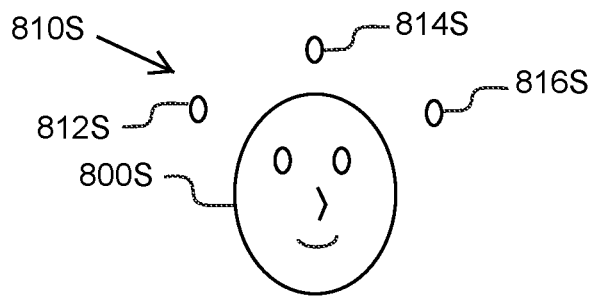
FIG. 8S is another graphical representation in accordance with an example embodiment.

FIG. 8S shows a graphical representation 800S with an indication 810S. The indication includes three circles that represent SLPs near the head or face of the graphical representation which is understood to represent the head of the second user. Each circle represents a different SLP where the first user can select to have binaural sound externally localize away from the head of the second user. One SLP 812S appears in front of and on a right side of the head of the graphical representation (representing the head of the second user); one SLP 814S appears in front of and above the head of the graphical representation (representing the head of the second user); one SLP 816S appears in front of and on a left side of the head of the graphical representation (representing the head of the second user).

Consider an example in which the graphical representation 800S displays on or through an electronic device of the first user (e.g., a HMD, smartphone, or wearable electronic device). The first user selects one of the indications 812S, 814S, or 816S and transmits the graphical representation 800S to the second user during an electronic communication between the first user and the second user. When the electronic device of the second user receives the graphical representation, the sound plays as binaural sound to the location of the indication selected by the first user. For example, if the first user selected 812S, then the binaural sound originates in front of and to a right side of the head of the second user since the location of 812S displayed to the first user was in front of and to a right side of the head of the graphical representation 800S.

Figure 8T:
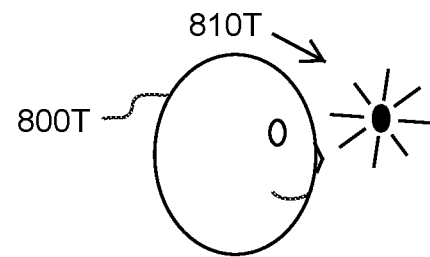
FIG. 8T is another graphical representation in accordance with an example embodiment.

FIG. 8T shows a graphical representation 800T with an indication 810T. The indication represents a SLP or location where binaural sound will emanate, is emanating, or did emanate with respect to the listener. The indication 810T is located in front of the face or head and shows a relative location where the binaural sound will originate. For example, the binaural sound will localize to a SLP that is in empty space about one meter away from the head or face of the listener as shown in FIG. 8T.

HRTFs with coordinate locations of the indication are stored in memory and retrieved upon selection of the indication.

Figure 8U:
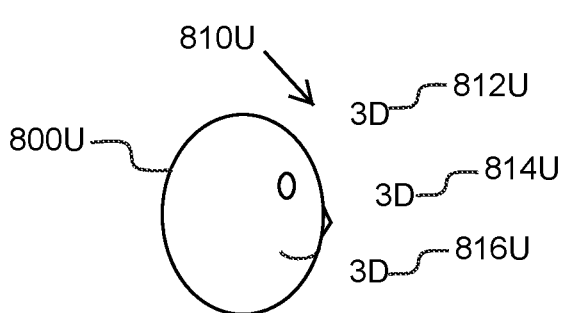
FIG. 8U is another graphical representation in accordance with an example embodiment.

FIG. 8U shows a graphical representation 800U with an indication 810U. The indication includes three symbols ("3D") that represent three-dimensional or binaural sound. Each 3D symbol represents SLPs near the head or face of the graphical representation which is understood to represent the head of the second user. Each 3D symbol represents a different SLP where the first user can select to have binaural sound externally localize away from the head of the second user. One 3D symbol 812U appears in front of and slightly above the face of the graphical representation (representing the head of the second user); one 3D symbol 814U appears directly front of the face of the graphical representation (representing the head of the second user); one 3D symbol 816U appears in front of and slightly below the face of the graphical representation (representing the head of the second user).

Consider an example in which the graphical representation 800U displays on or through an electronic device of the first user (e.g., a HMD, smartphone, or wearable electronic device). The first user sees three different locations for where he or she can select to have binaural sound localize to the second user. The 3D symbols visually inform the first user that the sound is binaural sound. The first user selects one of the indications 812U, 814U, or 816U and transmits the graphical representation 800U to the second user during an electronic communication between the first user and the second user. When the electronic device of the second user receives the graphical representation, the sound plays as binaural sound to the location of the indication selected by the first user. For example, if the first user selected 814U, then the binaural sound originates directly in front of face of the second user since the location of 814U displayed to the first user was directly in front of the face of the graphical representation 800U.

Figure 8V:
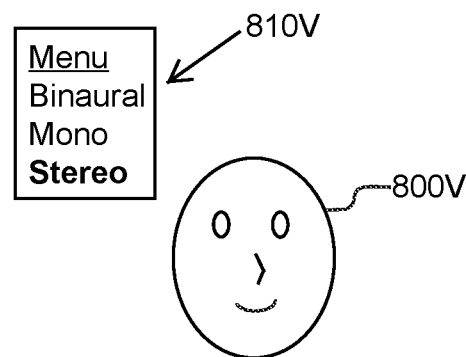
FIG. 8V is another graphical representation in accordance with an example embodiment.

FIG. 8V shows a graphical representation 800V with an indication 810V. The indication includes a menu that enables the user to select how sound will play to the listener. The menu options include playing the sound as binaural sound, mono sound, or stereo sound. The option "stereo" sound is bolded to indicate this is the option selected by the user.

Consider an example in which the first user sends the graphical representation 800V to the second user. The first user selects the option "binaural sound" from the menu and transmits the graphical representation to the second user. When the electronic device plays the sound of the graphical representation to the second user, the second user hears the sound as binaural sound since this was the selection of the first user.

Figure 8W:
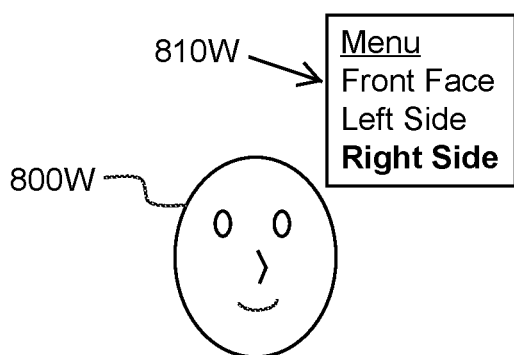
FIG. 8W is another graphical representation in accordance with an example embodiment.

FIG. 8W shows a graphical representation 800W with an indication 810W. The indication includes a menu that enables the user to select where binaural sound will play to the listener. The menu options include playing the binaural sound to originate in front of the face or head of the listener, playing the binaural sound to originate to a left side of the face or head of the listener, and playing the sound to originate to a right side of the face or head of the listener. The option "right side" is bolded to indicate this is the option selected by the user.

Consider an example in which the first user records a voice message and sends this voice message as the graphical representation 800W to the second user. The graphical representation is a moving 3D image of the face and head of the first user. The first user selects the option "right side" from the menu and transmits the graphical representation to the second user. When the electronic device plays the sound of the graphical representation to the second user, the graphical representation moves and talks to the second user. This action simulates the first user talking to the second user since the graphical representation emulates, copies, simulates, or represents the first user. The voice of the first user externally localizes to the second user at the location selected by the first user. Here, the first user selected his or her voice to externally localize as binaural sound to a right side of the head of the second user.

Figure 8X:
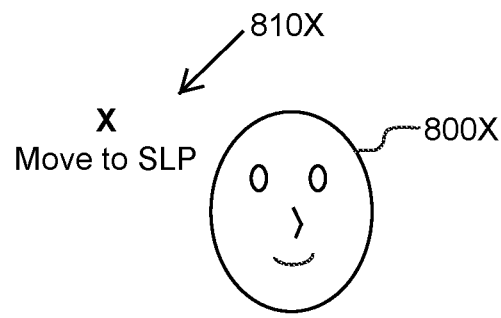
FIG. 8X is another graphical representation in accordance with an example embodiment.

FIG. 8X shows a graphical representation 800X with an indication 810X. The indication includes an "X" that represents the SLP where binaural sound will externally localize to the listener. Other indicia, symbols, words, images, etc. can be used instead of an "X" as shown.

The user can move the indication to different locations around the head or face. This movement enables the user to select a location where the listener will hear the binaural sound. If the user moves the X above the head, then the listener hears the sound above the head. If the user moves the X in front of the face, then the listener hears the sound in front of the face. The user can move the indication to the desired SLP.

Consider an example in which the first user moves the indication 810X to a location in front of the face of the graphical representation. The electronic device calculates a relative location of the indication with respect to the displayed head that is considered as an origin for a coordinate system. The electronic device calculates a coordinate location of the indication on the display with respect to the head. For example, this coordinate location is in spherical coordinates. Once the coordinate location is known, the electronic device consults a lookup table that includes coordinate locations for known HRTFs and selects the HRTF pair that matches the coordinate location calculated between the indication and the head. A processor processes or convolves the sound with the HRTF pair, and sound localizes to the listener at the coordinate location that corresponds to the location of the indication with respect to the displayed head.

Figure 8Y:
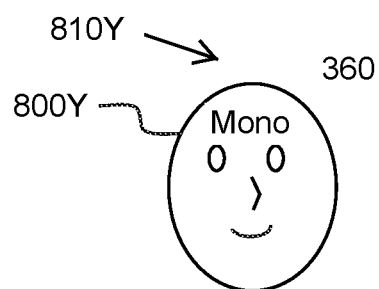
FIG. 8Y is another graphical representation in accordance with an example embodiment.

FIG. 8Y shows a graphical representation 800Y with two indications 810Y. One indication (360) indicates an option to hear the sound as binaural sound, and one indication (Mono) indicates an option to hear the sound as mono sound. Here, the display provides the listener with several different options or formats for hearing the sound and displays these options or formats on or with the graphical representation.

Figure 8Z:
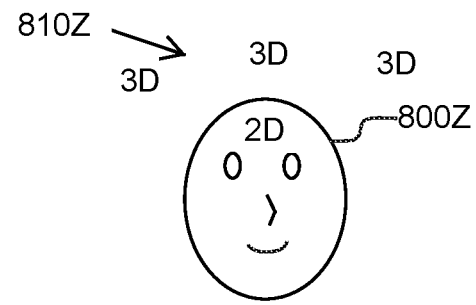
FIG. 8Z is another graphical representation in accordance with an example embodiment.
Figure 8A:
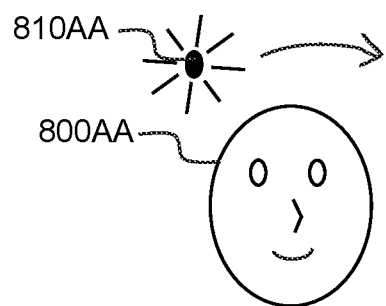
Figure 8B:
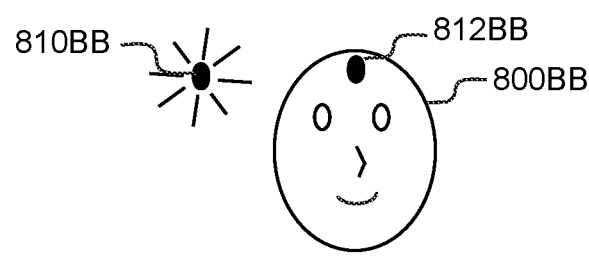
Figure 8C:
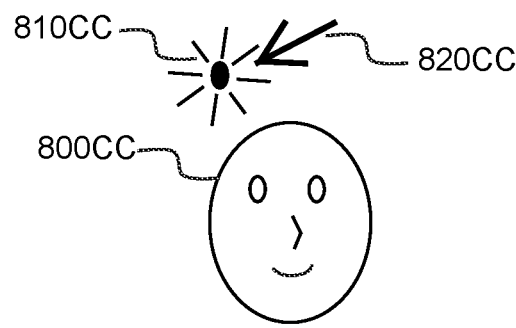

FIG. 8Z shows a graphical representation 800Z with multiple indications 810Z. Three indications (3D) indicate options and locations to hear the sound as binaural sound. Here, the listener has three different locations for hearing the sound with each 3D representing a different SLP. One indication (2D) indicates an option to hear the sound as mono sound. Here, the display provides the listener with four different options or multiple formats for hearing the sound and displays these options or formats on or with the graphical representation.

FIG. 8AA shows a graphical representation 800AA with an indication 810AA shown as source of binaural sound or SLP (a black dot with lines emanating from the black dot). An arrow shows the indication moving from a first location outside and above a first side of the head to a second location that is outside and above a second side of the head. This movement shows the user that the sound is 3D sound or binaural sound since the SLP moves outside of the head. Movement of the indication also draws attention to the user that the SLP of the sound will occur or is occurring outside the head of the user.

Consider an example in which the indication 810AA repeatedly moves along the path of the arrow (e.g., back and forth along the path of the arrow). The location on the display where the indication stops moving indicates the SLP where the sound will externally localize with respect to the listener.

FIG. 8BB shows a graphical representation 800BB with two indications that represent locations for a source of sound or SLPs. A first indication 810BB (shown as a black dot with lines emanating from the black dot) occurs outside the head and thus represents a location where binaural sound or 3D will originate or is originating to the listener. A second indication 812BB (shown as a block dot) occurs inside the head and thus represents a location where mono sound or stereo sound will originate or is originating to the listener.

Consider an example in which the indication 810BB and 812BB are simultaneously displayed to the listener. These indications represent options or locations where the listener can hear the sound. Selection of the indication 810BB provides the sound to the listener as binaural sound, whereas selection of the indication 812BB provides the sound to the listener as mono sound or stereo sound. Binaural sound originates outside the head of the listener, hence the indication 810BB is displayed outside the head of the graphical representation. Mono sound or stereo sound originates inside the head of the listener, hence the indication 812BB is displayed inside the head of the graphical representation.

Consider an example in which both indications are simultaneously displayed to the listener to show two options for where or how the listener can hear the sound. The listener issues a command or instruction to select one of the indications for where the sound will play. Upon receiving this selection, an electronic device removes the non-selected indication. For example, the listener selects indication 810BB, and this selection causes the electronic device displaying the indications to remove indication 812BB from being displayed.

FIG. 8CC shows a graphical representation 800CC with an indication 810CC shown as source of binaural sound or SLP (a black dot with lines emanating from the black dot). The user interacts with the SLP and moves it to a desired location for where sound will originate with respect to the listener. By way of example, the user interacts with the indication via pointer or arrow 820CC to select and move the indication to the desired SLP. When the indication is moved to a location outside the head of the graphical representation, the sound plays to the listener as binaural sound. When the indication is moved to a location inside the head of the graphical representation, the sound plays to the listener as mono sound or stereo sound.

Consider an example embodiment that assists playing sound of a graphical representation sent from a first person or user with a first portable electronic device (PED) to a second person or user with a second PED.

Consider an example embodiment in which the first visual indication includes the symbol 2D, and the second visual indication includes the symbol 3D.

Consider an example embodiment that highlights or emphasizes the first visual indication compared to the second visual indication when the sound of the graphical representation will play to the second person as the stereo sound. The example embodiment also highlights or emphasizes the second visual indication compared to the first visual indication when the sound of the graphical representation will play to the second person as the binaural sound.

Consider an example embodiment that displays the graphical representation to include a head. The example embodiment displays the first visual indication inside the head of the graphical representation to show that the sound of the graphical representation when the first visual indication is selected plays inside a head of the second person as the stereo sound. The example embodiment displays the second visual indication outside the head of the graphical representation to show that the sound of the graphical representation when the second visual indication is selected plays outside the head of the second person as the binaural sound.

Consider an example embodiment that removes the second visual indication from being displayed but leaves the first visual indication being displayed with the graphical representation when the second person selects to hear the sound of the graphical representation as the stereo sound. The example embodiment removes the first visual indication from being displayed but leaves the second visual indication being displayed with the graphical representation when the second person selects to hear the sound of the graphical representation as the binaural sound.

Consider an example embodiment that provides a recommendation to the second person to hear the sound of the graphical representation as the binaural sound by highlighting the second visual indication compared to the first visual indication.

Consider an example embodiment that displays, simultaneously with the graphical representation and the first and second visual indications, a plurality of graphical representations that play sound as the binaural sound and a plurality of graphical representations that play sound as the stereo sound.

Consider an example embodiment that tracks an amount of time that the first visual indication and the second visual indication are displayed with the second PED. The example embodiment removes the first visual indication and the second visual indication from being displayed with the second PED after the amount of time exceeds a threshold time.

Consider an example embodiment that removes the first visual indication and the second visual indication from being displayed with the second PED while the talking graphical representation remains being displayed with the second PED. The example embodiment senses when the second person will activate the talking graphical representation to play the sound of the talking emoji. The example embodiment further re-displays, in response to sensing that the second person will activate the talking graphical representation, the first visual indication and the second visual indication to indicate two options for playing the sound of the talking graphical representation. The two options include playing the sound as the stereo sound and playing the sound as the binaural sound.

Consider an example embodiment that plays the sound of the talking graphical representation as the stereo sound upon receiving an activation on the first visual indication that is a one of a pictogram and an ideogram. The example embodiment plays the sound of the talking graphical representation as the binaural sound upon receiving an activation on the second visual indication that is one of the pictogram and the ideogram.

Consider an example embodiment that displays, with the second PED, the first visual indication as one of a pictogram and an ideogram inside a body of the talking graphical representation. The example embodiment displays, with the second PED, the second visual indication as one of the pictogram and ideogram outside a body of the talking graphical representation.

Consider an example embodiment that repeatedly flashes, before the sound of the talking graphical representation plays, the second visual indication to indicate to the second person that the sound of the talking graphical representation will play as the binaural sound.

Consider an example embodiment that displays, with the second PED, the talking graphical representation to include a head and indicates that the sound of the talking graphical representation plays as the binaural sound by moving the second visual indication around the head of the talking graphical representation.

Consider an example embodiment that displays, with the second PED, the talking graphical representation to include a head and indicates a location where the binaural sound will externally localize to the second person by moving the second visual indication to the location with respect to the head of the talking graphical representation.

Consider an example embodiment that indicates that the sound of the talking graphical representation will play as one of mono sound and stereo sound upon selection of a first graphical representation displayed inside a body of the talking emoji. The example embodiment indicates that the sound of the talking graphical representation will play as three-dimensional (3D) sound upon selection of a second graphical representation displayed outside the body of the talking graphical representation.

Consider an example embodiment that displays the second graphical representation at a location with respect to the body of the talking graphical representation to show a sound localization point (SLP) where the sound of the talking graphical representation will externally localize with respect to a head of the second person upon activation of the talking graphical representation.

Consider an example embodiment that displays, with the second PED, the first graphical representation between two ears of the talking emoji to show that the sound of the talking graphical representation will internally localize inside a head of the second person as one of mono sound and stereo sound.

Consider an example embodiment that removes the first graphical representation from being displayed with the second PED but maintains the second graphical representation being displayed with the second PED when the second PED receives a selection to play the sound of the talking graphical representation as the 3D sound.

Consider an example embodiment in which the second graphical representation includes one of "3D" and "360" to inform the second person that the sound of the talking graphical representation is 3D sound.

Figure 9:
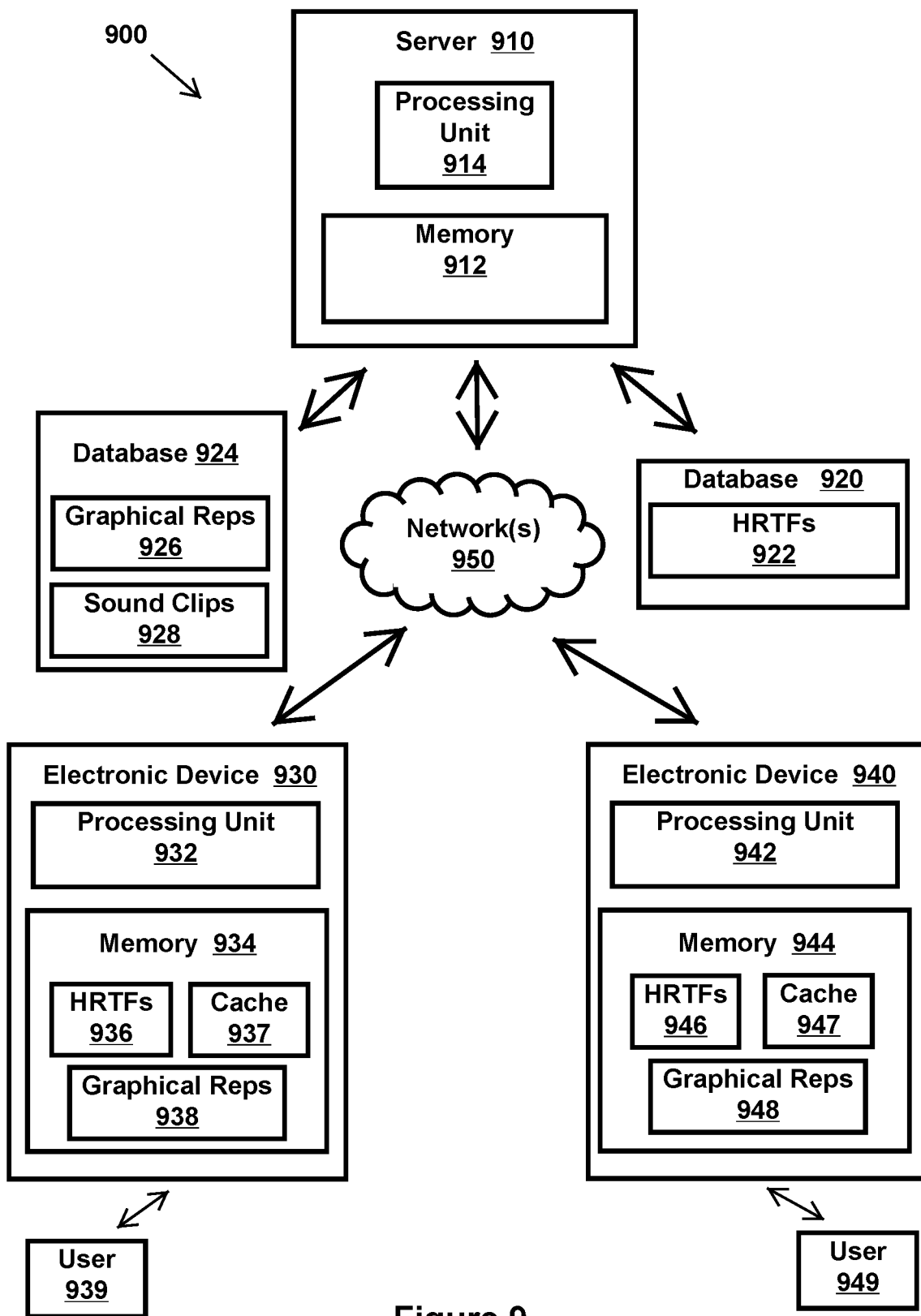
FIG. 9 is an example computer system in accordance with an example embodiment.

FIG. 9 is an example computer system 900 in accordance with an example embodiment.

The computer system 900 includes one or more of a server 910, a database 920, a database 924, an electronic device 930, and an electronic device 940 in communication over one or more networks 950. User 939 is with or uses electronic device 930, and user 949 is with or uses electronic device 940. For illustration, a single server 910, two databases 920 and 924, two electronic devices 930 and 940, and two users 939 and 949 are shown, but example embodiments can include one or more of a server, database, electronic device, and user.

Server 910 includes a memory 912 and a processing unit 914. The server 910 couples to or communicates with the database 920 that includes HRTFs and other sound localization information 922 and database 924 that includes graphical representations (reps) 926 and sound clips 928.

Electronic device 930 includes a processing unit 932 and memory 934 with HRTFs 936, cache 937, and graphical representations 938.

Electronic device 940 includes a processing unit 942 and memory 944 with HRTFs 946, cache 947, and graphical representations 948.

Figure 10:
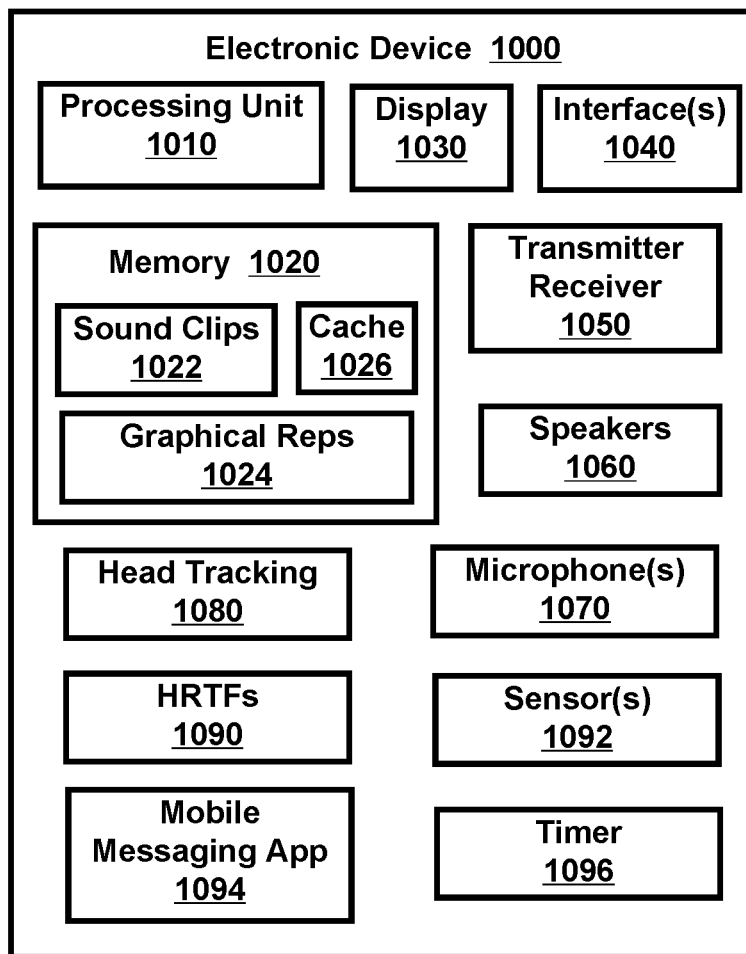
FIG. 10 is an example of an electronic device in accordance with an example embodiment.

FIG. 10 is an example of an electronic device 1000 in accordance with an example embodiment.

The electronic device 1000 includes a processor or processing unit 1010, memory 1020 with sound clips 1022, graphical representations or graphical reps 1024, and cache 1026, a display 1030, one or more interfaces 1040, a wireless transmitter/receiver 1050, speakers 1060, one or more microphones 1070, head tracking 1080 (such as one or more of an inertial sensor, accelerometer, gyroscope, and magnetometer), HRTFs 1090 (which are stored in memory), one or more sensors 1092 (such as one or more of a proximity sensor, pressure sensor, and camera), a mobile messaging application 1094, and a timer 1096 (such as a clock to time or track events in accordance with an example embodiment).

Mobile messaging applications are applications and/or platforms that enable one or more messaging/chatting, talking, sending/receiving graphical representations, file sharing, and various other forms of electronic communication. Such application can execute on HPEDs, PED, HMDs, and other electronic devices.

Memory includes computer readable medium (CRM).

Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

Sound clips include sound files, sounds, recorded messages (such as voice messages or other recorded sound), computer-generated sounds, and other sound discussed herein. For example, users can record, exchange, and/or transmit sound clips or sounds. These sounds include sending streaming sounds or sounds in real-time during an electronic communication.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein.

The electronic device provides sound to the users through one or more speakers. Alternatively, or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider another example in which sound clips, graphical representations, and/or HRTFs (or other transfer functions or impulse responses) are stored or cached in the DSP memory or local memory relatively close to the DSP to expedite binaural sound processing.

As used herein, "customized HRTFs" or "HRTFs that are customized" are specific to an anatomy of a particular listener and are based on a size and/or shape of the head and/or ears of the listener.

As used herein, an "emoji" is a graphical representation that includes images, symbols, or icons sent between users in electronic communications (such as text messages, e-mail, and social media) to express an emotional attitude of the writer, convey information, or communicate a message. Emojis can provide sound when activated or executed.

A "talking emoji" is an emoji that talks (e.g., with one or more words).

As used herein, "empty space" is a location that is not occupied by a tangible object.

As used herein, "graphical representations" include, but are not limited to, emoji, emoticons, animoji, icons, stickers, folders, documents, files, text or words, pictures, pictograms, ideograms, holograms, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "ideogram" is an icon or symbol that represents an idea or concept independent of any particular language and specific words or phrases.

As used herein, the word "pictogram" is an icon or symbol that conveys its meaning through its pictorial resemblance to a physical object.

As used herein, the word "proximate" means near. For example, binaural sound that externally localizes away from but proximate to a user localizes within three meters of the head of the user.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "sound localization information" or "SLI" is information that is used to process or convolve sound so the sound externally localizes as binaural sound to a listener.

As used herein, a "telephone call," or a "electronic call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A wearable electronic device (WED) worn on a head of a user, the WED comprising:
   a receiver that receives, from a WED of another user, an emoji; and
   a display that simultaneously displays the emoji and a first visual indication in augmented reality (AR) or virtual reality (VR) that when selected plays sound of the emoji in stereo sound and a second visual indication in AR or VR that when selected plays the sound of the emoji in binaural sound.

2. The WED of claim 1, wherein the first visual indication and the second visual indication include an acronym or letters that indicate whether the sound will play as the stereo sound or the binaural sound.

3. The WED of claim 1, wherein the display highlights the first visual indication compared to the second visual indication when the sound of the emoji plays as the stereo sound and highlights the second visual indication compared to the first visual indication when the sound of the emoji plays as the binaural sound.

4. The WED of claim 1, wherein the first visual indication and the second visual indication connect to a body of the emoji.

5. The WED of claim 1, wherein the second visual indication is removed from being displayed but the first visual indication remains being displayed with the emoji in response to the sound of the emoji playing as the stereo sound.

6. The WED of claim 1, wherein the first visual indication is removed from being displayed but the second visual indication remains being displayed with the emoji in response to the sound of the emoji playing as the binaural sound.

7. The WED of claim 1, wherein the display highlights the second visual indication while the sound of the emoji plays as the binaural sound.

8. A wearable electronic device (WED) worn on a head of a user, the WED comprising:
   a receiver that receives, from an electronic device of another user, an emoji that plays sound; and
   a display that displays the emoji in augmented reality (AR) or virtual reality (VR) along with a first visual indication that indicates that the sound of the emoji when the first visual indication is activated will localize inside the head of the user and a second visual indication that indicates that the sound of the emoji when the second visual indication is activated will localize in an empty space outside the head of the user.

9. The WED of claim 8 further comprising:
   a timer that tracks an amount of time that the first visual indication and the second visual indication are displayed, wherein the WED removes the first visual indication and the second visual indication from being displayed after the amount of time exceeds a threshold.

10. The WED of claim 8 further comprising:
    a sensor that senses when the user activates the emoji to play, wherein the display highlights the first visual indication in response to the sensor sensing the user activated the first visual indication.

11. The WED of claim 8 further comprising:
    a sensor that senses when the user activates the emoji to play, wherein the display highlights the second visual indication in response to the sensor sensing the user activated the second visual indication.

12. The WED of claim 8, wherein the first visual indication is one of a pictogram and an ideogram connected a body of the emoji, and the second visual indication is one of the pictogram and ideogram outside the body of the emoji.

13. The WED of claim 8, wherein the display repeatedly flashes the second visual indication to indicate that the sound of the emoji plays to localize in the empty space outside the head of the user.

14. The WED of claim 8, wherein the emoji includes a head, and the second visual indication is located around the head of the emoji.

15. The WED of claim 8, wherein the second visual indication indicates a location with respect to the head of the user where the sound of the emoji externally localizes to the user.

16. A method, comprising:
    receiving, at a wearable electronic device (WED) worn on a head of a user and from an electronic device of another user, an emoji; and displaying, with a display of the WED, the emoji simultaneously with a first graphical representation that indicates sound of the emoji will play to internally localize inside the head of the user when selected and a second graphical representation that indicates the sound of the emoji will play to externally localize in an empty space outside the head of the user when selected.

17. The method of claim 16 further comprising:
displaying, with the display of the WED, the second graphical representation at a location with respect to the emoji to show a sound localization point (SLP) where the sound of the emoji externally localizes in the empty space outside the head of the user.

18. The method of claim 16 further comprising:
displaying, with the display of the WED, the first graphical representation inside a body of the emoji to show the sound of the emoji plays to internally localize inside the head of the user.

19. The method of claim 16 further comprising:
removing the first graphical representation from being displayed but maintaining the second graphical representation being displayed when the WED receives a selection to play the sound of the emoji as 3D sound.

20. The method of claim 16, wherein the second graphical representation includes one of "3D" and "360" that indicates the sound plays to externally localize in the empty space outside the head of the user.

* * * * *